US012574176B2

(12) United States Patent
Huang et al.

(10) Patent No.: US 12,574,176 B2
(45) Date of Patent: Mar. 10, 2026

(54) SIGNAL TRANSMISSION METHOD AND APPARATUS, AND DEVICE AND STORAGE MEDIUM

(71) Applicant: DATANG MOBILE COMMUNICATIONS EQUIPMENT CO., LTD., Beijing (CN)

(72) Inventors: Qiuping Huang, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 423 days.

(21) Appl. No.: 18/013,541

(22) PCT Filed: Jun. 28, 2021

(86) PCT No.: PCT/CN2021/102722
§ 371 (c)(1),
(2) Date: Dec. 28, 2022

(87) PCT Pub. No.: WO2022/001946
PCT Pub. Date: Jan. 6, 2022

(65) Prior Publication Data
US 2023/0291521 A1     Sep. 14, 2023

(30) Foreign Application Priority Data
Jun. 28, 2020    (CN) .......................... 202010599408.0

(51) Int. Cl.
*H04W 72/0446* (2023.01)
*H04L 5/00* (2006.01)
(Continued)

(52) U.S. Cl.
CPC .......... *H04L 5/0048* (2013.01); *H04L 5/0096* (2013.01)

(58) Field of Classification Search
USPC ........................................................ 370/336
See application file for complete search history.

(56) References Cited

U.S. PATENT DOCUMENTS

2020/0178223 A1     6/2020  Kang et al.
2020/0195479 A1     6/2020  Shi et al.
(Continued)

FOREIGN PATENT DOCUMENTS

CN         108282879 A      7/2018
CN         108616345 A     10/2018
(Continued)

OTHER PUBLICATIONS

European Patent Office, Extended European Search Report Issued in Application No. 21833104.9, 6 pages.

*Primary Examiner* — Maharishi V Khirodhar
(74) *Attorney, Agent, or Firm* — KILPATRICK TOWNSEND & STOCKTON LLP

(57) ABSTRACT

Provided in the embodiments of the present application are a signal transmission method and apparatus, and a device and a storage medium. The method includes: configuring first information for a second device, where the first information is used to indicate a time-domain transmission location of a signal corresponding to a first signal resource and/or a first signal resource set; and sending the first information to the second device by means of signaling. Therefore, according to the embodiments of the present application, a second device performs corresponding signal transmission on the basis of the flexible scheduling of a first device, to improve the signal transmission reliability and flexibility.

17 Claims, 4 Drawing Sheets

Receiving first information sent by a first device according to setting signaling, where the first information is used for indicating a time domain transmission position of a signal corresponding to each of first signal resources and/or each of first signal resource sets — S201

Determining the time domain transmission position of the signal corresponding to each of the first signal resources and/or each of the first signal resource sets based on the first information — S202

(51) Int. Cl.
    *H04W 84/12*        (2009.01)
    *H04W 84/18*        (2009.01)

(56)            References Cited

U.S. PATENT DOCUMENTS

| | | | |
|---|---|---|---|
| 2020/0314871 A1* | 10/2020 | Sun | H04W 24/10 |
| 2020/0412581 A1* | 12/2020 | Zhang | H04W 72/23 |
| 2023/0114925 A1* | 4/2023 | Yang | H04W 72/0446 |
| 2024/0072864 A1* | 2/2024 | Yang | H04L 5/0078 |
| 2024/0188029 A1* | 6/2024 | Huang | H04L 5/0051 |

FOREIGN PATENT DOCUMENTS

| | | | |
|---|---|---|---|
| CN | 109496438 A | 3/2019 |
| CN | 110391882 A | 10/2019 |
| CN | 110611948 A | 12/2019 |
| CN | 110650001 A | 1/2020 |
| CN | 110719148 A | 1/2020 |
| CN | 110741697 A | 1/2020 |
| CN | 110890947 A | 3/2020 |
| CN | 111050394 A | 4/2020 |
| CN | 111092706 A | 5/2020 |
| CN | 111885683 A | 11/2020 |
| WO | 2020110098 A1 | 6/2020 |

* cited by examiner

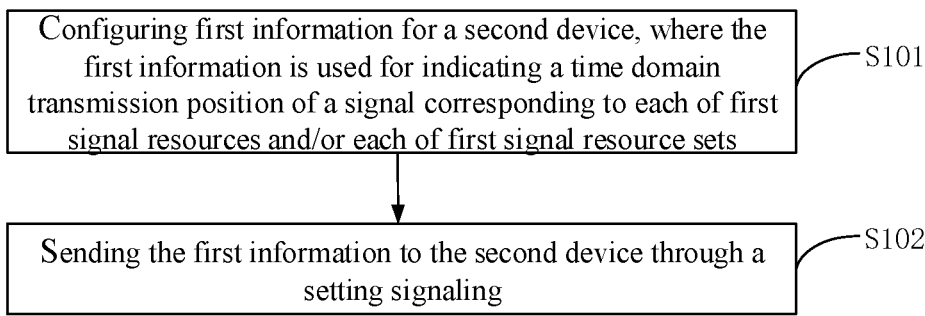

Configuring first information for a second device, where the first information is used for indicating a time domain transmission position of a signal corresponding to each of first signal resources and/or each of first signal resource sets — S101

Sending the first information to the second device through a setting signaling — S102

FIG. 1

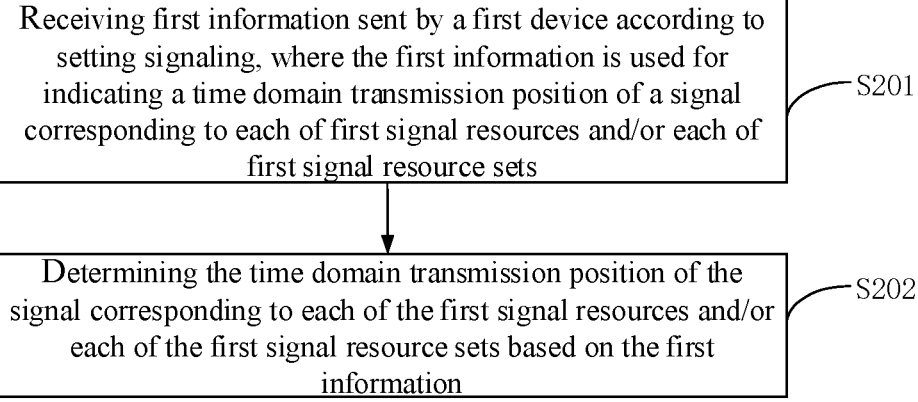

Receiving first information sent by a first device according to setting signaling, where the first information is used for indicating a time domain transmission position of a signal corresponding to each of first signal resources and/or each of first signal resource sets — S201

Determining the time domain transmission position of the signal corresponding to each of the first signal resources and/or each of the first signal resource sets based on the first information — S202

FIG. 2

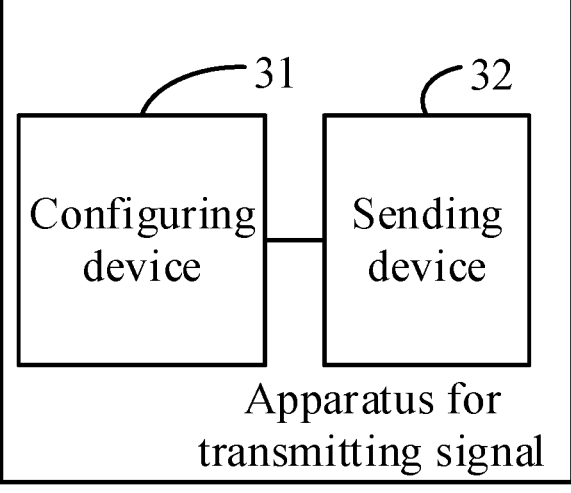

31

32

Configuring device

Sending device

Apparatus for transmitting signal

FIG. 3

SIGNAL TRANSMISSION METHOD AND APPARATUS, AND DEVICE AND STORAGE MEDIUM

CROSS-REFERENCE TO RELATED APPLICATION

The present application is a US National Stage of International Application No. PCT/CN2021/102722, filed on Jun. 28, 2021, which claims priority to Chinese patent application No. 202010599408.0 filed on Jun. 28, 2020, entitled "Signal Transmission Method and Apparatus, and Device and Storage Medium", which is incorporated herein by reference in its entirety.

FIELD

The present application relates to the field of communication, and in particular, to methods and apparatuses for transmitting a signal, devices, and storage mediums.

BACKGROUND

In traditional communication systems, a reference signal configured by a base station for a terminal does not always exist, and the reference signal under some configurations can only be sent after being triggered or activated. If the base station configures a reference signal for the terminal and sends trigger signaling or activation signaling of the reference signal to the terminal, the terminal needs to determine a timing at which the reference signal was sent based on a predefined timeline relation between triggering and sending the reference signal or a timeline relation indicated by the base station between triggering and sending the reference signal after the terminal receives the signaling. Therefore, how to determine the timing at which the reference signal was sent is an urgent problem to be solved currently.

SUMMARY

In view of the problems above, embodiments of the present application provide methods and apparatuses for transmitting a signal, devices, and storage mediums.

An embodiment of the present application provides a method for transmitting a signal, performed by a first device, including:

configuring first information for a second device, where the first information is used for indicating a time-domain transmission location of a signal corresponding to a first signal resource and/or a first signal resource set; and sending the first information to the second device through signaling.

In an embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value.

In an embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The method further includes:

sending first offset signaling for indicating the setting offset value to the second device.

In an embodiment, a mode for configuring the first information includes:

configuring the first information for each of one or more first signal resources; or configuring the first information for each of one or more first signal resource sets; or configuring a common first information for all the first signal resources and/or all the first signal resource sets triggered or activated by a same signaling.

In an embodiment, the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

In an embodiment, the first offset value is used for indicating m time units, where m is a first number;

a time unit where the time-domain transmission location is located is the m-th available time unit after a first time unit; or a time unit where the time-domain transmission location is located is the $1^{st}$ available time unit after m available time units after a first time unit; or a time unit where the time-domain transmission location is located is the m-th time unit after a first time unit; or a time unit where the time-domain transmission location is located is the $1^{st}$ time unit after m time units after a first time unit; or a time unit where the time-domain transmission location is located is the m-th available time unit counting from a first time unit; or a time unit where the time-domain transmission location is located is the $1^{st}$ available time unit after the m-th available time unit counting from a first time unit; or a time unit where the time-domain transmission location is located is the m-th time unit counting from a first time unit; or a time unit where the time-domain transmission location is located is the $1^{st}$ time unit counting from the (m+1)-th time unit counting from a first time unit; or a starting time unit of the time-domain transmission location is the m-th available time unit after a first time unit; or a starting time unit of the time-domain transmission location is the $1^{st}$ available time unit after m available time units after a first time unit; or a starting time unit of the time-domain transmission location is the m-th time unit after a first time unit; or a starting time unit of the time-domain transmission location is the $1^{st}$ time unit after m time units after a first time unit; or a starting time unit of the time-domain transmission location is the m-th available time unit counting from a first time unit; or a starting time unit of the time-domain transmission location is the $1^{st}$ available time unit after the m-th available time unit counting from a first time unit; or a starting time unit of the time-domain transmission location is the m-th time unit counting from a first time unit; or a starting time unit of the time-domain transmission location is the $1^{st}$ time unit counting from the (m+1)-th time unit counting from a first time unit.

In an embodiment, the first time unit is one of the followings:

a time unit where first signaling is located, where the first signaling is used for triggering a transmission of the signal corresponding to the first signal resource and/or the first signal resource set; or a time unit where a signaling for transmitting the first information is located.

In an embodiment, the setting offset value is used for indicating k time units; and the second offset value is used for indicating t time units, where k is a second number and t is a third number;

a time unit where the time-domain transmission location is located is the t-th available time unit counting from the (k+1)-th time unit after a second time unit; or a time unit where the time-domain transmission location is located is the $1^{st}$ available time unit after t available time units counting from the (k+1)-th time unit counting from a second time unit; or a time unit where the time-domain transmission location is located is the (k+t)-th time unit after a second time unit; or a time unit where the time-domain transmission location is located is the $1^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the $1^{st}$ available time unit after t available time units after the k-th time unit counting from a second time unit; or a time unit where the time-domain transmission location is located is the (t+k)-th time unit counting from a second time unit; or a time unit where the time-domain transmission location is located is the $1^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the $1^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the $1^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the $1^{st}$ available time unit after t available time units after the k-th time unit counting from a second time unit; or a starting time unit of the time-domain transmission location is the (t+k)-th time unit counting from a second time unit; or a starting time unit of the time-domain transmission location is the $1^{st}$ time unit counting from the (k+t+1) time units counting from a second time unit.

In an embodiment, the second time unit is one of the followings:

a time unit where second signaling is located, where the second signaling is used for triggering a transmission of the signal corresponding to the first signal resource and/or the first signal resource set; or a time unit where a signaling for transmitting the first information is located.

In an embodiment, the second offset value is valid within a first time window;

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In an embodiment, the method further includes:

configuring second information for the second device, where the second information is used for indicating candidate time-domain transmission locations of the signal corresponding to the first signal resource and/or the first signal resource set; and sending the second information to the second device.

The first information is used for indicating the time-domain transmission location of the signal corresponding to the first signal resource and/or the first signal resource set, includes:

the first information is used for selecting the time-domain transmission location of the signal corresponding to the first signal resource and/or the first signal resource set from candidate time-domain transmission locations.

In an embodiment, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a downlink control information (DCI) for triggering the transmission of the signal corresponding to the downlink signal resource, and the minimum timing requirement is the one for transmission of the first signal and a DCI triggering the first signal.

In an embodiment, the sending the first information to the second device through signaling includes: sending the first information to the second device through a first DCI and/or a first medium access control layer-control element (MAC-CE); or sending a joint coding result to the second device through a second DCI and/or a second MAC-CE;

where a DCI format of the first DCI is a DCI format for carrying the first information; and/or the first DCI includes an information field for carrying the first information; and the joint coding result is a result obtained by jointly coding a trigger message and the first information and the trigger message is used for triggering the transmission of the signal corresponding to the first signal resource and/or the first signal resource set.

In an embodiment, the method further includes:

configuring third information for the second device, where the third information is used for indicating that whether the first device configures the first information for the second device; and/or configuring fourth information for the second device, where the fourth information is used for indicating a bit width of the first information.

An embodiment of the present application provides a method for transmitting a signal, performed by a second device, including:

receiving first information sent by a first device through signaling, where the first information is used for indicating a time-domain transmission location of a signal corresponding to a first signal resource and/or a first signal resource set; and determining the time-domain transmission location of the signal corresponding to the first signal resource and/or the first signal resource set based on the first information.

In an embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value;

the determining the time-domain transmission location of the signal corresponding to the first signal resource and/or the first signal resource set based on the first information, includes:

determining the time-domain transmission location based on the first offset value, or the first offset value and the first signal transmission mode.

In an embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The method further includes:

receiving first offset signaling sent by the first device and used for indicating the setting offset value;

the determining the time-domain transmission location of the signal corresponding to the first signal resource and/or the first signal resource set based on the first information, includes:

determining the time-domain transmission location based on the second offset value and the setting offset value, or based on the second offset value and the second signal transmission mode.

In an embodiment, the method further includes:

sending the signal corresponding to the first signal resource and/or the first signal resource set at the time-domain transmission location; or receiving the signal corresponding to the first signal resource and/or the first signal resource set at the time-domain transmission location.

In an embodiment, the receiving the first information sent by the first device through the signaling, includes:

receiving the first information configured by the first device for each of one or more first signal resources; or receiving the first information configured by the first device for each of one or more first signal resource sets; or receiving a common first information configured by the first device for all the first signal resources and/or all the first signal resource sets triggered or activated by a same signaling.

In an embodiment, the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

In an embodiment, the first offset value is used for indicating m time units, where m is a first number;

the determining the time-domain transmission location based on the first offset value, or the first offset value and the first signal transmission mode, includes:

determining, based on the first offset value, or the first offset value and the first signal transmission mode, the time-domain transmission location satisfying one of the following cases:

a time unit where the time-domain transmission location is located is the m-th available time unit after a first time unit; or a time unit where the time-domain transmission location is located is the $1^{st}$ available time unit after m available time units after a first time unit; or a time unit where the time-domain transmission location is located is the m-th time unit after a first time unit; or a time unit where the time-domain transmission location is located is the $1^{st}$ time unit after m time units after a first time unit; or a time unit where the time-domain transmission location is located is the m-th available time unit counting from a first time unit; or a time unit where the time-domain transmission location is located is the $1^{st}$ available time unit after the m-th available time unit counting from a first time unit; or a time unit where the time-domain transmission location is located is the m-th time unit counting from a first time unit; or a time unit where the time-domain transmission location is located is the 1$^{st}$ time unit counting from the (m+1)-th time unit counting from a first time unit; or a starting time unit of the time-domain transmission location is the m-th available time unit after a first time unit; or a starting time unit of the time-domain transmission location is the 1$^{st}$ available time unit after m available time units after a first time unit; or a starting time unit of the time-domain transmission location is the m-th time unit after a first time unit; or a starting time unit of the time-domain transmission location is the 1$^{st}$ time unit after m time units after a first time unit; or a starting time unit of the time-domain transmission location is the m-th available time unit counting from a first time unit; or a starting time unit of the time-domain transmission location is the 1$^{st}$ available time unit after the m-th available time unit counting from a first time unit; or a starting time unit of the time-domain transmission location is the m-th time unit counting from a first time unit; or a starting time unit of the time-domain transmission location is the 1$^{st}$ time unit counting from the (m+1)-th time unit counting from a first time unit.

In an embodiment, the first time unit is one of the followings:

a time unit where first signaling is located, where the first signaling is used for triggering a transmission of the signal corresponding to the first signal resource and/or the first signal resource set; or a time unit where a signaling for transmitting the first information is located.

In an embodiment, the setting offset value is used for indicating k time units; and the second offset value is used for indicating t time units, where k is a second number and t is a third number;

a time unit where the time-domain transmission location is located is the t-th available time unit counting from the (k+1)-th time unit after a second time unit; or a time unit where the time-domain transmission location is located is the 1$^{st}$ available time unit after t available time units counting from the (k+1)-th time unit counting from a second time unit; or a time unit where the time-domain transmission location is located is the (k+t)-th time unit after a second time unit; or a time unit where the time-domain transmission location is located is the 1$^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the 1$^{st}$ available time unit after t available time units after the k-th time unit counting from a second time unit; or a time unit where the time-domain transmission location is located is the (t+k)-th time unit counting from a second time unit; or a time unit where the time-domain transmission location is located is the 1$^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the 1$^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the 1$^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the 1$^{st}$ available time unit after t available time units after the k-th time unit counting from a second time unit; or a starting time unit of the time-domain transmission location is the (t+k)-th time unit counting from a second time unit; or a starting time unit of the time-domain transmission location is the 1$^{st}$ time unit counting from the (k+t+1) time units counting from a second time unit.

In an embodiment, the second time unit is one of the followings:

a time unit where second signaling is located, where the second signaling is used for triggering a transmission of the signal corresponding to the first signal resource and/or the first signal resource set; or a time unit where a signaling for transmitting the first information is located.

In an embodiment, the second offset value is valid within a first time window;

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In an embodiment, the method further includes:

receiving second information sent by the first device, where the second information is used for indicating candidate time-domain transmission locations of the signal corresponding to the first signal resource and/or the first signal resource set; and determining candidate time-domain transmission locations of the signal corresponding to the first signal resource and/or the first signal resource set based on the second information.

The determining the time-domain transmission location of the signal corresponding to the first signal resource and/or the first signal resource set based on the first information, includes:

selecting, based on the first information, the time-domain transmission location of the signal corresponding to the first signal resource and/or the first signal resource set from candidate time-domain transmission locations.

In an embodiment, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a downlink control information (DCI) for triggering the transmission of the signal corresponding to the downlink signal resource, and the minimum timing requirement is the one for transmission of the first signal and a DCI triggering the first signal.

In an embodiment, the receiving the first information sent by the first device through the signaling, includes:

receiving the first information sent by the first device through a first DCI and/or a first medium access control layer-control element (MAC-CE); or receiving a joint coding result sent by the first device through a second DCI and/or a second MAC-CE, and determining the first information based on the joint coding result;

where a DCI format of the first DCI is a DCI format for carrying the first information; and/or the first DCI includes an information field for carrying the first information; and the joint coding result is a result obtained by jointly coding a trigger message and the first information and the trigger message is used for triggering the transmission of the signal corresponding to the first signal resource and/or the first signal resource set.

In an embodiment, the method further includes:

obtaining third information configured by the first device for the second device, where the third information is used for indicating whether the first device configures the first information for the second device; determining that whether the first device configures the first information for the second device according to the third information; and obtaining the first information when it is determined that the first device has configured the first information for the second device; and/or obtaining fourth information configured by the first device for the second device, where the fourth information is used for indicating a bit width of the first information; determining the bit width of the first information according to the fourth information; and determining the first information based on the bit width.

An embodiment of the present application provides an apparatus for transmitting a signal, applied to a first device, including:

a configuring device, used for configuring first information for a second device, where the first information is used for indicating a time-domain transmission location of a signal corresponding to a first signal resource and/or a first signal resource set; and a sending device, used for sending the first information to the second device through signaling.

An embodiment of the present application provides an apparatus for transmitting a signal, applied to a second device, including:

a receiving device, used for receiving first information sent by a first device through signaling, where the first information is used for indicating a time-domain transmission location of a signal corresponding to a first signal resource and/or a first signal resource set; and a determining device, used for determining the time-domain transmission location of the signal corresponding to the first signal resource and/or the first signal resource set based on the first information.

An embodiment of the present application provides a first device, including a processor and a memory storing a program that is executable on the processor, the program, when executed by the processor, causes the processor to perform the following steps:

configuring first information for a second device, where the first information is used for indicating a time-domain transmission location of a signal corresponding to a first signal resource and/or a first signal resource set; and sending the first information to the second device through signaling.

In an embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value.

In an embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The program causes the processor to further perform the following steps:

sending first offset signaling for indicating the setting offset value to the first device.

An embodiment of the present application provides a second device, including a processor and a memory storing a program that is executable on the processor, the program, when executed by the processor, causes the processor to perform the following steps:

receiving first information sent by a first device through signaling, where the first information is used for indicating a time-domain transmission location of a signal corresponding to a first signal resource and/or a first signal resource set; and determining the time-domain transmission location of the signal corresponding to the first signal resource and/or the first signal resource set based on the first information.

In an embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value;

the determining the time-domain transmission location of the signal corresponding to the first signal resource and/or the first signal resource set based on the first information, includes:

determining the time-domain transmission location based on the first offset value, or the first offset value and the first signal transmission mode.

In an embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The program causes the processor to further perform the following steps:

receiving first offset signaling sent by the first device and used for indicating the setting offset value;

the determining the time-domain transmission location of the signal corresponding to the first signal resource and/or the first signal resource set based on the first information, includes:

determining the time-domain transmission location based on the second offset value and the setting offset value, or based on the second offset value and the second signal transmission mode.

An embodiment of the present application provides a non-transitory computer-readable storage medium storing computer programs that, when executed by a processor, causes a processor to perform a method for transmitting signal mentioned above.

An embodiment of the present application provides a non-transitory computer-readable storage medium storing computer programs that, when executed by a processor, causes a processor to perform a method for transmitting signal mentioned above.

In the methods and apparatuses for transmitting a signal, devices, and storage mediums, by configuring first information for a second device, where the first information is used for determining, by the second device, a time-domain transmission location of a signal corresponding to a first signal resource and/or a first signal resource set; and sending the first information to the second device through signaling, the second device can determine the time-domain transmission location of the signal corresponding to the first signal resource and/or the first signal resource set and perform corresponding signal transmission based on the flexible scheduling of the first device, which improves the reliability and flexibility of signal transmission.

BRIEF DESCRIPTION OF THE DRAWINGS

In order to more clearly illustrate solutions according to the embodiments of the present application, the drawings used in the descriptions of the embodiments will be briefly described below. The drawings in the following description are some embodiments of the present application, and other drawings can be obtained according to the drawings.

FIG. 1 is a schematic flowchart showing a method for transmitting signal according to an embodiment of the present application;

FIG. 2 is a schematic flowchart showing a method for transmitting signal according to an embodiment of the present application;

FIG. 3 is a schematic block diagram showing an apparatus for transmitting signal according to an embodiment of the present application;

DETAILED DESCRIPTION

Figure 4:
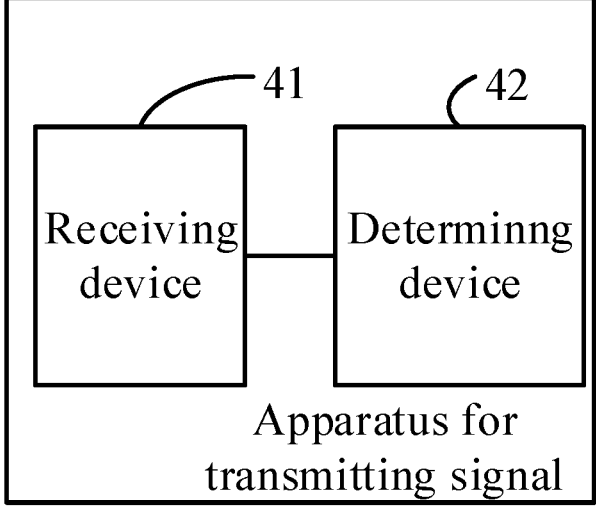
FIG. 4 is a schematic block diagram showing an apparatus for transmitting signal according to an embodiment of the present application.

In order to make the embodiments of the present application more clear, the solutions in the embodiments of the present application are clearly and completely described in the following with reference to the accompanying drawings in the embodiments of the present application. These embodiments are a part of the embodiments of the present application, and not all of the embodiments. All other embodiments obtained are based on the embodiments of the present application and are within the scope of the present application.

For clearly describing embodiments of the present application, words such as "first" and "second" in each embodiment of the present application are used to distinguish the same or similar items that have basically the same function and effect and it is appreciated that these words such as "first" and "second" do not limit the quantity and execution order.

In traditional communication systems, a reference signal configured by a base station for a terminal does not always exist, and the reference signal under some configurations can only be sent after being triggered or activated. If the base station configures a reference signal for the terminal and sends trigger signaling or activation signaling of the reference signal to the terminal, the terminal needs to determine a timing at which the reference signal was sent based on a predefined timeline relation between triggering and sending the reference signal or a timeline relation indicated by the base station between triggering and sending the reference signal after the terminal receives the signaling. Therefore, how to determine the timing at which the reference signal was sent is an urgent problem to be solved currently.

In view of problems above, embodiments of the present application provide methods and apparatuses for transmitting a signal, devices, and storage mediums to improve the flexibility of signal transmission.

The methods and apparatuses for transmitting a signal, devices, and storage mediums according to the present application can be applied to wireless communication systems or wireless and wired combined systems. The systems include, but not limited to, 5G systems (such as NR systems), 6G systems, satellite systems, internet of vehicles systems, evolved long term evolution (LTE) systems, and subsequent evolution communication systems of the above systems, etc.

Base stations according to embodiments of the present application can include, but not limited to, one or more of the followings: commonly used base stations, evolved node base stations (eNBs), and node base stations in 5G systems (for example, next generation node base stations, (gNBs), transmission and reception points (TRPs)) and other base stations.

The terminal according to embodiments of the present application can be referred to as user equipment (UE) or the like. Terminals include, but not limited to, handheld devices and vehicle-mounted devices. For example, it can be a mobile phone, a tablet computer, a notebook computer, an ultra-mobile personal computer (UMPC), a netbook, or a personal digital assistant (PDA).

The solutions according to embodiments of the present application will be described through the following embodiments.

FIG. 1 is a schematic flowchart showing a method for transmitting signal according to an embodiment of the present application. The method can be performed by a first device, such as a base station, or a terminal having some functions of access point. As shown in FIG. 1, the method includes the following steps:

S101, configuring first information for a second device, where the first information is used for indicating a time-domain transmission location of a signal corresponding to a first signal resource and/or a first signal resource set.

In an embodiment, the signal corresponding to the first signal resource and/or the first signal resource set can refer to a reference signal configured by the first device for the second device. The reference signal can be an aperiodic or semi-persistent uplink signal, such as a sounding reference signal (SRS); or can be an aperiodic or semi-persistent downlink signal, such as a channel state information-reference signal (CSI-RS), a channel state information interference measurement (CSI-IM) resource, etc.

S102, sending the first information to the second device through a signaling.

In an embodiment, the first device can send the first information to the second device through a signaling. The signaling can be downlink control information (DCI) signaling, medium access control-control element (MAC-CE) signaling, or radio resource control (RRC) signaling, etc.

From the above embodiments, by configuring first information for the second device, where the first information is used for indicating the time-domain transmission location of the signal corresponding to the first signal resource and/or the first signal resource set, and sending the first information to the second device through the signaling, the second device can determine the time-domain transmission location of the signal corresponding to the first signal resource and/or the first signal resource set according to the first information and perform corresponding signal transmission based on the flexible scheduling of the first device, which improves the reliability and flexibility of signal transmission.

Based on the above embodiments, the signaling in S102 may not be RRC signaling, but be other signaling or signaling combination, such as DCI signaling, MAC-CE signaling, or a combination of MAC-CE and RRC signaling, etc.

Since the RRC signaling is semi-statically configured, the flexibility of signal transmission may be affected to a certain extent if the first information is sent to the second device through the RRC signaling.

From the above embodiments, when sending the first information to the second device through the signaling but not through the RRC signaling directly, the flexibility of signal transmission is further ensured.

Based on the above embodiments, the first information in S101 can include a first offset value, where the first offset value is used for indicating the time-domain transmission location; or the first information includes the first offset value and a first signal transmission mode, where the first signal transmission mode is used for indicating the second device to determine the time-domain transmission location according to the first offset value.

In an embodiment, the first offset value can indicate a time offset value, such as a slot offset value.

From the above embodiments, after the first offset value, or the first offset value and the first signal transmission mode are sent to the second device through signaling, the second device can directly determine the time-domain transmission location of the signal corresponding to the first signal resource and/or the first signal resource set according to the first offset value; or determine the time-domain transmission location of the signal corresponding to the first signal resource and/or the first signal resource set according to the first offset value and the first signal transmission mode, which improves the flexibility of signal transmission.

Based on the above embodiments, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

In an embodiment, the role of the second offset value is to further adjust the time-domain transmission location of the signal corresponding to the first signal resource and/or the first signal resource set, and thus the signal corresponding to the first signal resource and/or the first signal resource set can be flexibly scheduled.

In an embodiment, the method can further include the following steps:

S103, sending a first offset signaling for indicating the setting offset value to the second device.

In an embodiment, the setting offset value can indicate a time offset value, such as a slot offset value. The setting offset value can be an offset value when there is no second offset value.

From the above embodiments, after the second offset value, or the second offset value and the second signal transmission mode are sent to the second device through signaling, the second device can determine the time-domain transmission location of the signal corresponding to the first signal resource and/or the first signal resource set according to the second offset value and the setting offset value; or determine the time-domain transmission location of the signal corresponding to the first signal resource and/or the first signal resource set according to the second offset value and the second signal transmission mode, which further improves the flexibility of signal transmission.

In an embodiment, when the first device does not indicate a second offset value greater than 0 to the second device, the second device determines that the second offset value indicated by the first device is 0, and can determine the time-domain transmission location of the signal corresponding to the first signal resource and/or the first signal resource set by using the setting offset value.

In an embodiment, in addition to the second offset value, the first information can further include a third offset value, a fourth offset value, and the like.

In an embodiment, when the first information is sent to the second device through signaling, the first information can be indicated through one signaling, or can be indicated through multiple signalings.

In an embodiment, the second offset value is a time domain offset value of a start timing at which the signal corresponding to the first signal resource and/or the first signal resource set corresponding to the second offset value is transmitted relative to a transmission timing indicated by the first offset signaling of the first signal resource and/or the first signal resource set.

In an embodiment, the second device can determine a sum of a slot position of the signal corresponding to the first signal resource and/or the first signal resource set and a slot corresponding to the second offset value as the time-domain transmission location of the signal corresponding to the first signal resource and/or the first signal resource set, where the slot position is determined according to the first offset signaling and a time-domain location at which a trigger signaling for triggering or activating the signal corresponding to the first signal resource and/or the first signal resource set is located.

In an embodiment, first offset signalings for different first signal resources can be different. For example, the first device can configure the first offset signaling for each first signal resource, separately.

In an embodiment, first offset signalings for different first signal resource sets can be different. For example, the first device can configure the first offset signaling for each first signal resource set, separately. When the first signal resource set includes multiple first signal resources, in one embodiment is to determine time domain starting locations of signals corresponding to all first signal resources according to the first offset signaling; another embodiment is to determine time domain starting locations of signals corresponding to some first signal resources according to the first offset signaling, and the time domain starting locations of signals corresponding to the remaining first signal resources are determined according to the time domain starting locations of signals corresponding to the some first signal resources.

In an embodiment, the first offset signaling and the signaling can be signalings with different types. For example, the first offset signaling is RRC signaling, and the signaling is DCI signaling; or the first offset signaling is RRC signaling, and the signaling is MAC-CE signaling; or the first offset signaling is MAC-CE signaling, and the signaling is DCI signaling.

From the above embodiments, through the second offset value, the first device is able to send the signaling for scheduling or activating the signal corresponding to the first signal resource and/or the first signal resource set more flexibly, and to send the signal corresponding to the first signal resource and/or the first signal resource set more flexibly, which avoids that signals corresponding to all the first signal resources and/or the first signal resource set and triggered by signaling are sent in the same slot to a certain extent and avoids multiple trigger signalings, used for triggering the signals corresponding to the first signal resources and/or the first signal resource sets, congest or collide to a certain extent, and provides a certain guarantee for successful transmission of the signals corresponding to the first signal resource and/or the first signal resource set.

Based on the foregoing embodiments, when S101 is performed, it can include:

S1011, configuring the first information for each of one or more first signal resources; or S1012, configuring the first information for each of one or more first signal resource sets; or S1013, configuring a common first information for all the first signal resources and/or all the first signal resource sets triggered or activated by a same signaling.

From the above embodiments, the first information can be configured separately for each of the first signal resources, or the first information can be configured separately for each of one or more first signal resource sets, or the common first information can be configured for all the first signal resources and/or all the first signal resource sets triggered or activated by the same signaling, which further improves the flexibility of information transmission.

Based on the foregoing embodiments, in S101, the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

Based on the above method, in case that the first information in S101 includes a first offset value, the first offset value is used for indicating the time-domain transmission location; or in case that the first information includes the first offset value and a first signal transmission mode, the first signal transmission mode is used for indicating the second device to determine the time-domain transmission location according to the first offset value;

where the first offset value is used for indicating m time units, where m is a first number;

a time unit where the time-domain transmission location is located is the m-th available time unit after a first time unit; or a time unit where the time-domain transmission location is located is the $1^{st}$ available time unit after m available time units after a first time unit, e.g. the (m+1)-th available time unit after a first time unit; or a time unit where the time-domain transmission location is located is the m-th time unit after a first time unit; or a time unit where the time-domain transmission location is located is the $1^{st}$ time unit after m time units after a first time unit; or a time unit where the time-domain transmission location is located is the m-th available time unit counting from a first time unit; or a time unit where the time-domain transmission location is located is the $1^{st}$ available time unit after the m-th available time unit counting from a first time unit; or a time unit where the time-domain transmission location is located is the m-th time unit counting from a first time unit; or a time unit where the time-domain transmission location is located is the $1^{st}$ time unit counting from the (m+1)-th time unit counting from a first time unit; or a starting time unit of the time-domain transmission location is the m-th available time unit after a first time unit; or a starting time unit of the time-domain transmission location is the $1^{st}$ available time unit after m available time units after a first time unit; or a starting time unit of the time-domain transmission location is the m-th time unit after a first time unit; or a starting time unit of the time-domain transmission location is the $1^{st}$ time unit after m time units after a first time unit; or a starting time unit of the time-domain transmission location is the m-th available time unit counting from a first time unit; or a starting time unit of the time-domain transmission location is the $1^{st}$ available time unit after the m-th available time unit counting from a first time unit; or a starting time unit of the time-domain transmission location is the m-th time unit counting from a first time unit; or a starting time unit of the time-domain transmission location is the $1^{st}$ time unit counting from the (m+1)-th time unit counting from a first time unit.

It should be noted that the B-th time unit counting from time unit A is time unit (A+B−1), e.g. the B-th slot counting from slot A is slot (A+B−1).

In an embodiment, the first time unit is one of the followings:

a time unit where first signaling is located, where the first signaling is used for triggering the transmission of the signal corresponding to the first signal resource and/or the first signal resource set; or a time unit where a signaling for transmitting the first information is located.

In an embodiment, the time unit where the time-domain transmission location is located can be applied to an occasion in which the time-domain transmission location is located at one time unit; and the starting time unit of the time-domain transmission location can be applied to an occasion in which the time-domain transmission location is located at multiple time units.

Based on the above embodiments, the first information in S101 includes a second offset value, where the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value;

where the setting offset value is used for indicating k time units; and the second offset value is used for indicating t time units, where k is a second number and t is a third number;

a time unit where the time-domain transmission location is located is the t-th available time unit counting from the (k+1)-th time unit after a second time unit; or a time unit where the time-domain transmission location is located is the $1^{st}$ available time unit after t available time units counting from the (k+1)-th time unit counting from a second time unit, as an example, if the time unit is slot, and the second time unit is slot n, then the time unit where the time-domain transmission location is located is the (t+1)-th available slot counting from slot (n+k); or a time unit where the time-domain transmission location is located is the (k+t)-th time unit after a second time unit; or a time unit where the time-domain transmission location is located is the $1^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the $1^{st}$ available time unit after t available time units after the k-th time unit counting from a second time unit; or a time unit where the time-domain transmission location is located is the (t+k)-th time unit counting from a second time unit; or a time unit where the time-domain transmission location is located is the $1^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the $1^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the $1^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the $1^{st}$ available time unit after t available time units after the k-th time unit counting from a second time unit; or a starting time unit of the time-domain transmission location is the (t+k)-th time unit counting from a second time unit; or a starting time unit of the time-domain transmission location is the $1^{st}$ time unit counting from the (k+t+1) time units counting from a second time unit.

In an embodiment, the second time unit is one of the followings:

a time unit where second signaling is located, where the second signaling is used for triggering the transmission of the signal corresponding to the first signal resource and/or the first signal resource set; or a time unit where a signaling for transmitting the first information is located.

In an embodiment, the time unit where the time-domain transmission location is located can be applied to an occasion that the time-domain transmission location is located at one time unit; and the starting time unit of the time-domain transmission location can be applied to an occasion that the time-domain transmission location is located at multiple time units.

Based on the foregoing embodiments, the foregoing second offset value can be used for indicating:

the time unit where the time-domain transmission location is located is a time unit obtained by counting the second offset value of time units from a time unit determined according to a first time-domain location and the first offset signaling; or the time unit where the time-domain transmission location is located is a time unit obtained by counting the second offset value of available time units from a time unit determined according to the first time-domain location and the first offset signaling;

where the first time-domain location is a time-domain location where first signaling is located, the first signaling is used for triggering the transmission of the signal corresponding to the first signal resource and/or the first signal resource set.

Based on the foregoing embodiments, the foregoing second offset value can be used for indicating:

a time domain offset value of a time unit, where start timing of the transmission of the signal corresponding to the first signal resource and/or the first signal resource set activated or triggered by a trigger signaling is located, relative to a time unit determined according to the first offset signaling, where the trigger signaling and the second offset value are sent through the same DCI.

Based on the foregoing embodiments, the foregoing second offset value is valid within a first time window:

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In an embodiment, the predefined time window can be a time window with a fixed size; or a time window determined according to the offset value indicated by the first offset signaling; or a time window determined according to the second offset value, etc.

Based on the foregoing embodiments, S102 can be performed by the following ways but not limited thereto:

S1021: sending the first information to the second device through a first DCI and/or a first MAC-CE.

In an embodiment, the first information can be added to the first DCI and/or the first MAC-CE, and the first DCI and/or the first MAC-CE carrying the first information can be sent to the second device. In this way, the second device can acquire the first information from the first DCI and/or the first MAC-CE, and determine the time-domain transmission location of the signal corresponding to the first signal resource and/or the first signal resource set according to the first information.

From the above embodiments, when sending the first information to the second device through signaling, the first information can be sent to the second device through the first DCI and/or the first MAC-CE, which diversifies the implementation manners to transmit the first information and thus further ensures the flexibility of subsequent signal transmission.

Based on the foregoing embodiments, a DCI format of the first DCI in S1021 is a DCI format for carrying the first information; and/or the first DCI includes an information field specifically used for carrying the first information.

In an embodiment, a DCI format, such as DCIformat2_X, for carrying of the second signaling, can be additionally provided. X refers to a temporarily uncertain specific value, for example, X can be 7, 8, 9, 10, and so on.

In an embodiment, the first information can be carried in the traditional DCI format. For example, the first information can be carried in DCI format 0_1/0_2/1_1/1_2, etc. For example, an information field (such as an SRS offset field) can be added to these traditional DCIs to carry the first information.

From the above embodiments, the DCI format of the first DCI is a DCI format for carrying the first information; and/or the first DCI includes an information field for carrying the first information, which improves the reliability of the first information transmission.

Based on the foregoing embodiments, the first information in S1021 is included in the first DCI for triggering the transmission of the signal corresponding to the first signal resource and/or the first signal resource set.

In an embodiment, the first DCI can trigger the transmission of the signal corresponding to the first signal resource and/or the first signal resource set, and the first information included in the first DCI can be used to determine the time-domain transmission location of the signal corresponding to the first signal resource and/or the first signal resource set.

Based on the foregoing embodiments, the first information included in the first DCI in S1021 is applied to all first signal resources and/or first signal resource sets triggered by the first DCI.

In an embodiment, the positions of the start time units of the signals corresponding to all first signal resources and/or the first signal resource sets triggered by the first DCI are the same.

From the above embodiments, the first DCI can indicate the first information while triggering the transmission of the signal corresponding to the first signal resource and/or the first signal resource set, and thus the second device can determine positions of the start time units of the signals corresponding to all first signal resources and/or all the first signal resource sets triggered by the first DCI according to the time unit where the first DCI is located and the first information indicated by the first DCI, which improves the efficiency of determining the time-domain transmission location.

Based on the foregoing embodiments, S102 can be performed by the following ways, but not limited thereto:

S1022: sending a joint coding result to the second device through a second DCI and/or a second MAC-CE. The joint coding result is a result obtained by jointly coding a trigger message and the first information, and the trigger message is used for triggering the transmission of the signal corresponding to the first signal resource and/or the first signal resource set.

Based on the foregoing embodiments, one or more code points of the signaling used for indicating the joint coding result in S1022 carry both a trigger state and the first information.

From the above embodiment, the trigger message and the first information can be jointly coded, the joint coding result can be sent to the second device through the second DCI and/or the second MAC-CE, and the second device can obtain the trigger message and the first information through the joint coding result, which diversifies the implementation manner of the first information transmission and improves the security of the first information transmission.

Based on the foregoing embodiments, when S1021 is performed, it can include:

S1023: determining trigger signaling for triggering the first signal resource and/or the first signal resource set; and S1024: sending the trigger signaling to the second device through a third DCI, where the third DCI is different from the first DCI.

From the above embodiments, the first information and the trigger signaling can be transmitted through different DCIs, which diversifies the implementation manner of the first information transmission and increases the diversity of the first information transmission.

Based on the above embodiments, the method includes the following steps:

S104: configuring third information for the second device, where the third information is used for indicating that whether the first device configures the first information for the second device; and S105: sending the third information to the second device for indicating the second device to determine whether the first device configures the first information for the second device according to the third information.

Based on the above embodiments, the method includes the following steps:

S106: configuring fourth information for the second device, where the fourth information is used for indicating a bit width (or referred to as payload) of the first information.

In an embodiment, the bit width of the first information can be 0 bits, or 1 bit, 2 bits, 3 bits, and so on.

In an embodiment, when the bit width of the first information is 0, the second offset value is 0.

S107: sending the fourth information to the second device for indicating the second device to determine the bit width of the first information according to the fourth information.

From the above embodiments, the first device can select an appropriate payload for the first information according to application scenarios or actual business conditions, which can save information payload compared to always taking the maximum bit width as the payload of the first information.

Based on the above embodiments, the method includes the following steps:

S108: configuring second information for the second device, where the second information is used for indicating candidate time-domain transmission locations of the signal corresponding to the first signal resource and/or the first signal resource set; and S109: sending the second information to the second device for indicating the second device to determine, according to the second information, candidate time-domain transmission locations of the signal corresponding to the first signal resource and/or the first signal resource set.

In S101, the first information is used for indicating a time-domain transmission location of the signal corresponding to the first signal resource and/or the first signal resource set, includes:

the first information is used for selecting the time-domain transmission location of the signal corresponding to the first signal resource and/or the first signal resource set from candidate time-domain transmission locations.

In an embodiment, the first device can indicate candidate time-domain transmission locations for the first signal resource and/or the first signal resource set through MAC-CE, and indicate the first information through DCI, that is, select one from candidate time-domain transmission locations as the actual time-domain transmission location of the signal corresponding to the first signal resource and/or the first signal resource set.

In an embodiment, the first device can indicate candidate time-domain transmission locations for the first signal resource and/or the first signal resource set through RRC signaling, and indicate the first information through the MAC-CE signaling, that is, select one from candidate time-domain transmission locations as the actual time-domain transmission location of the signal corresponding to the first signal resource and/or the first signal resource set.

In an embodiment, the first device can indicate candidate time-domain transmission locations for the first signal resource and/or the first signal resource set through RRC signaling, select multiple candidate time-domain transmission locations through MAC-CE signaling from candidate time-domain transmission locations, and indicate the first information through DCI, that is, select one from the multiple candidate time-domain transmission locations as the actual time-domain transmission location of the signal corresponding to the first signal resource and/or the first signal resource set.

Based on the foregoing embodiments, the second information in S108 can include a third time offset value corresponding to each of the candidate time-domain transmission locations and the third time offset value is used for indicating p time units;

the third time offset value can be used for indicating:

a time unit where the candidate time-domain transmission location is located is the p-th available time unit after a third time unit; or a time unit where the candidate time-domain transmission location is located is the $1^{st}$ available time unit after p available time units after a third time unit; or a time unit where the candidate time-domain transmission location is located is the p-th time unit after a third time unit; or a time unit where the candidate time-domain transmission location is located is the $1^{st}$ time unit after p time units after a third time unit; or a time unit where the candidate time-domain transmission location is located is the p-th available time unit counting from a third time unit; or a time unit where the candidate time-domain transmission location is located is the $1^{st}$ available time unit after the p-th available time unit counting from a third time unit; or a time unit where the candidate time-domain transmission location is located is the p-th time unit counting from the third time unit; or a time unit where the candidate time-domain transmission location is located is the $1^{st}$ time unit counting from the (p+1)-th time unit counting from a third time unit; or a starting time unit of the candidate time-domain transmission location is the p-th available time unit after a third time unit; or a starting time unit of the candidate time-domain transmission location is the $1^{st}$ available time unit after p available time units after a third time unit; or a starting time unit of the candidate time-domain transmission location is the p-th time unit after a third time unit; or a starting time unit of the candidate time-domain transmission location is the $1^{st}$ time unit after p time units after a third time unit; or a starting time unit of the candidate time-domain transmission location is the p-th available time unit counting from a third time unit; or a starting time unit of the candidate time-domain transmission location is the $1^{st}$ available time unit after the p-th available time unit counting from a third time unit; or a starting time unit of the candidate time-domain transmission location is the p-th time unit counting from the third time unit; or a starting time unit of the candidate time-domain transmission location is the $1^{st}$ time unit counting from the (p+1)-th time unit counting from a third time unit.

In an embodiment, the third time unit is one of the followings:

a time unit where a third signaling used for triggering the transmission of the signal corresponding to the first signal resource and/or the first signal resource set is located (for example, a time unit where DCI carrying a triggering signaling for the first signal resource and/or the first signal resource set is located, or a time unit where a PDCCH carrying the DCI is located); or a time unit where the signaling for transmitting the first information is located (for example, a time unit where the DCI carrying the first information is located, or a time unit where the PDCCH carrying the DCI is located).

Based on the foregoing embodiments, the time unit is a slot.

Based on the foregoing embodiments, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set (for example, an available uplink slot for one SRS resource set is a slot satisfying: there are available uplink symbols for the time-domain transmission location for all SRS resources in the SRS resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, n available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a downlink control information (DCI) for triggering the transmission of the signal corresponding to the downlink signal resource, and the minimum timing requirement is the one for transmission of the first signal and a DCI triggering the first signal.

FIG. 2 is a schematic flowchart showing a method for transmitting signal according to an embodiment of the present application. The method can be performed by a second device, such as a terminal. As shown in FIG. 2, the method includes the following steps:

S201: receiving first information sent by a first device according to signaling, where the first information is used for indicating a time-domain transmission location of a signal corresponding to a first signal resource and/or a first signal resource set.

In an embodiment, the signal corresponding to the first signal resource and/or the first signal resource set can refer to a reference signal configured by the first device for the second device. The reference signal can be an aperiodic or semi-persistent uplink signal, such in case that the first signal resource is an aperiodic uplink signal resource or a semi-persistent uplink signal resource, an available time unit is a slot as SRS, or can be an aperiodic or semi-persistent downlink signal, such as CSI-RS, CSI-IM, and so on.

In an embodiment, the signaling can be DCI signaling, or MAC-CE signaling, or RRC signaling.

S202: determining the time-domain transmission location of the signal corresponding to each of one or more first signal resources and/or each of one or more first signal resource sets based on the first information.

From the above embodiments, by receiving the first information sent by the first device according to the signaling, where the first information is used by the second device to determine the time-domain transmission location of the signal corresponding to the first signal resource and/or the first signal resource set, and determining the time-domain transmission location of the signal corresponding to the first signal resource and/or the first signal resource set, the second device performs corresponding signal transmission based on the flexible scheduling of the first device, which improves the reliability and flexibility of signal transmission.

Based on the above embodiments, the signaling in S201 may not be RRC signaling, but be other signaling or signaling combination, such as DCI signaling, MAC-CE signaling, or a combination of MAC-CE and RRC signaling, etc.

Since the RRC signaling is semi-statically configured, the flexibility of signal transmission may be affected to a certain extent if the second device receives the first information sent by the first device through the RRC signaling.

Based on the above embodiments, the first information in S201 includes a first offset value used for indicating the time-domain transmission location; or the first information includes the first offset value and a first signal transmission mode, where the first signal transmission mode is used for indicating the second device to determine the time-domain transmission location according to the first offset value.

In an embodiment, S202 can include:

S2021: determining the time-domain transmission location based on the first offset value, or the first offset value and the first signal transmission mode.

From the above embodiments, after the first offset value, or the first offset value and the first signal transmission mode are received through signaling, the time-domain transmission location of the signal corresponding to the first signal resource and/or the first signal resource set can be determined directly according to the first offset value, or the time-domain transmission location of the signal corresponding to the first signal resource and/or the first signal resource set can be determined according to the first offset value and the first signal transmission mode, which improves the flexibility of signal transmission.

Based on the above embodiments, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

In an embodiment, the role of the second offset value is to further adjust the time-domain transmission location of the signal corresponding to the first signal resource and/or the first signal resource set, and thus the signal corresponding to the first signal resource and/or the first signal resource set can be flexibly scheduled.

In an embodiment, the method can further include the following steps:

S203: receiving first offset signaling sent by the first device and used for indicating the setting offset value.

In an embodiment, the setting offset value can indicate a time offset value, such as a slot offset value. The setting offset value can be an offset value when there is no second offset value.

In an embodiment, S202 can include:

S2022: determining the time-domain transmission location based on the second offset value and the setting offset value, or based on the second offset value and a second signal transmission mode.

From the above embodiments, after the second offset value, or the second offset value and the second signal transmission mode are received through signaling, the time-domain transmission location of the signal corresponding to the first signal resource and/or the first signal resource set can be determined according to the second offset value and the setting offset value; or the time-domain transmission location of the signal corresponding to the first signal resource and/or the first signal resource set can be determined according to the second offset value and the second signal transmission mode, which further improves the flexibility of signal transmission.

In an embodiment, when the first device does not indicate a second offset value greater than 0 to the second device, the second device determines that the second offset value indicated by the first device is 0, and can determine the time-domain transmission location of the signal corresponding to the first signal resource and/or the first signal resource set by using the setting offset value.

In an embodiment, the second offset value is a time domain offset value of a start timing at which the signal corresponding to the first signal resource and/or the first signal resource set corresponding to the second offset value is transmitted relative to a transmission timing indicated by the first offset signaling of the first signal resource and/or the first signal resource set.

In an embodiment, the second device can determine a sum of a slot position of the signal corresponding to the first signal resource and/or the first signal resource set and a slot corresponding to the second offset value as the time-domain transmission location of the signal corresponding to the first signal resource and/or the first signal resource set, where the slot position is determined according to the first offset signaling and a time-domain location at which a trigger signaling for triggering or activating the signal corresponding to the first signal resource and/or the first signal resource set is located.

In an embodiment, first offset signalings of different first signal resources can be different. For example, the first device can configure the first offset signaling for each first signal resource, separately.

In an embodiment, first offset signalings of different first signal resource sets can be different. For example, the first device can separately configure the first offset signaling for each first signal resource set, separately. When the first signal resource set includes multiple first signal resources, in one embodiment is to determine time domain starting locations of signals corresponding to all first signal resources according to the first offset signaling; another embodiment is to determine time domain starting locations of signals corresponding to some first signal resources according to the first offset signaling, and the time domain starting locations of signals corresponding to the remaining first signal resources are determined according to the time domain starting locations of signals corresponding to the some first signal resources.

In an embodiment, the first offset signaling and the signaling can be signalings with different types. For example, the first offset signaling is RRC signaling, and the signaling is DCI signaling; or the first offset signaling is RRC signaling, and the signaling is MAC-CE signaling; or the first offset signaling is MAC-CE signaling, and the signaling is DCI signaling.

Based on the above embodiments, the method further includes the following steps:

S204: sending the signal corresponding to the first signal resource and/or the first signal resource set at the time-domain transmission location; or receiving the signal corresponding to the first signal resource and/or the first signal resource set at the time-domain transmission location.

In general, in a communication system, in case that the second device is a terminal and the first device is a base station, if the signal corresponding to the first signal resource and/or the first signal resource set is an uplink signal, the second device sends the signal corresponding to the first signal resource and/or the first signal resource set at the time-domain transmission location. In one embodiment, if the signal corresponding to the first signal resource and/or the first signal resource set is a downlink signal, the second device receives the signal corresponding to the first signal resource and/or the first signal resource set at the time-domain transmission location.

Based on the foregoing embodiments, S201 can include:

S2011: receiving the first information configured by the first device for each of one or more first signal resources; or S2012: receiving the first information configured by the first device for each of one or more first signal resource sets; or S2013: receiving a common first information configured by the first device for all the first signal resources and/or all the first signal resource sets triggered or activated by a same signaling.

From the above embodiments, the first information configured by the first device separately for each of one or more first signal resources can be received, or the first information configured by the first device separately for each of one or more first signal resource sets can be received, or the common first information configured by the first device for all first signal resources and/or all the first signal resource sets triggered or activated by the same signaling can be received, which further improves the flexibility of information transmission.

Further, on the basis of the method mentioned above, in S201:

the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

Based on the foregoing embodiments, the first offset value in S2021 is used for indicating m time units, where m is a first number; and S2021 can be performed by the following implementation, but not limited thereto:

S2023: determining, based on the first offset value, or the first offset value and the first signal transmission mode, the time-domain transmission location satisfying one of the following cases:

a time unit where the time-domain transmission location is located is the m-th available time unit after a first time unit; or a time unit where the time-domain transmission location is located is the 1$^{st}$ available time unit after m available time units after a first time unit; or a time unit where the time-domain transmission location is located is the m-th time unit after a first time unit; or a time unit where the time-domain transmission location is located is the 1$^{st}$ time unit after the m time units after a first time unit; or a time unit where the time-domain transmission location is located is the m-th available time unit counting from a first time unit; or a time unit where the time-domain transmission location is located is the 1$^{st}$ available time unit after the m-th available time unit counting from a first time unit; or a time unit where the time-domain transmission location is located is the m-th time unit counting from a first time unit; or a time unit where the time-domain transmission location is located is the 1$^{st}$ time unit counting from the (m+1)-th time unit counting from a first time unit; or a starting time unit of the time-domain transmission location is the m-th available time unit after a first time unit; or a starting time unit of the time-domain transmission location is the 1$^{st}$ available time unit after m available time units after a first time unit; or a starting time unit of the time-domain transmission location is the m-th time unit after a first time unit; or a starting time unit of the time-domain transmission location is the 1$^{st}$ time unit after m time units after a first time unit; or a starting time unit of the time-domain transmission location is the m-th available time unit counting from a first time unit; or a starting time unit of the time-domain transmission location is the 1$^{st}$ available time unit after the m-th available time unit counting from a first time unit; or a starting time unit of the time-domain transmission location is the m-th time unit counting from a first time unit; or a starting time unit of the time-domain transmission location is the 1$^{st}$ time unit counting from the (m+1)-th time unit counting from a first time unit.

In an embodiment, the first time unit is one of the followings:

a time unit where first signaling is located, where the first signaling is used for triggering the transmission of the signal corresponding to the first signal resource and/or the first signal resource set; or a time unit where a signaling for transmitting the first information is located.

Based on the foregoing embodiments, the setting offset value in S2022 is used for indicating k time units; and the second offset value is used for indicating t time units, where k is a second number and t is a third number. S2022 can be performed by the following ways, but not limited thereto:

S2024: determining, based on the second offset value and the setting offset value, or the second offset value and a second signal transmission mode, the time-domain transmission location satisfying one of the following cases:

a time unit where the time-domain transmission location is located is the t-th available time unit counting from the (k+1)-th time unit after a second time unit; or a time unit where the time-domain transmission location is located is the 1$^{st}$ available time unit after t available time units counting from the (k+1)-th time unit counting from a second time unit; or a time unit where the time-domain transmission location is located is the (k+t)-th time unit after a second time unit; or a time unit where the time-domain transmission location is located is the 1$^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the 1$^{st}$ available time unit after t available time units after the k-th time unit counting from a second time unit; or a time unit where the time-domain transmission location is located is the (t+k)-th time unit counting from a second time unit; or a time unit where the time-domain transmission location is located is the 1$^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the 1$^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the 1$^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the 1$^{st}$ available time unit after t available time units after the k-th time unit counting from a second time unit; or a starting time unit of the time-domain transmission location is the (t+k)-th time unit counting from a second time unit; or a starting time unit of the time-domain transmission location is the 1$^{st}$ time unit counting from the (k+t+1) time units counting from a second time unit.

In an embodiment, the second time unit is one of the followings:

a time unit where second signaling is located, where the second signaling is used for triggering the transmission of the signal corresponding to the first signal resource and/or the first signal resource set; or a time unit where a signaling for transmitting the first information is located.

Based on the foregoing embodiments, S2022 can be performed by the following ways, but not limited thereto:

the time unit where the time-domain transmission location is located is a time unit obtained by counting the second offset value of time units from a time unit determined according to a first time-domain location and the first offset signaling; or the time unit where the time-domain transmission location is located is a time unit obtained by counting the second offset value of available time units from a time unit determined according to the first time-domain location and the first offset signaling;

where the first time-domain location is a time-domain location where first signaling is located, the first signaling is used for triggering the transmission of the signal corresponding to the first signal resource and/or the first signal resource set.

Based on the foregoing embodiments, S2022 can be performed by the following ways, but not limited thereto:

a time unit where start timing of the transmission of the signal corresponding to the first signal resource and/or the first signal resource set activated or triggered by a trigger signaling is located is a time unit obtained by counting the second offset value of time units from a time unit determined according to the first offset signaling, where the trigger signaling and the second offset value are sent through the same DCI.

Based on the foregoing embodiments, the second offset value in S2021 is valid within a first time window:

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In an embodiment, the predefined time window can be a time window with a fixed size; or a time window determined according to the offset value indicated by the first offset signaling; or a time window determined according to the second offset value, etc.

Based on the foregoing embodiments, S201 can be performed by the following ways but not limited thereto:

S2014: receiving the first information sent by the first device through a first DCI and/or a first MAC-CE.

Based on the foregoing embodiments, a DCI format of the first DCI in S2014 is a DCI format for carrying the first information; and/or the first DCI includes an information field specifically used for carrying the first information.

In an embodiment, a DCI format, such as DCIformat2_X, can be added for carrying the first information. X refers to a temporarily uncertain specific value, for example, X can be 7, 8, 9, 10, and so on.

In an embodiment, the first information can be carried in the traditional DCI format. For example, the first information can be carried in DCI format 0_1/0_2/1_1/1_2, etc. For example, an information field (such as an SRS offset field) can be added to these traditional DCIs to carry the first information.

From the above embodiments, the DCI format of the first DCI is a DCI format for carrying the first information; and/or the first DCI includes an information field for carrying the first information, which improves the reliability of the first information transmission.

Based on the foregoing embodiments, the first information in S2014 is included in the first DCI for triggering the transmission of the signal corresponding to the first signal resource and/or the first signal resource set.

In an embodiment, the first DCI can trigger the transmission of the signal corresponding to the first signal resource and/or the first signal resource set, and the first information included in the first DCI can be used to determine the time-domain transmission location of the signal corresponding to the first signal resource and/or the first signal resource set.

When S202 is performed, the located of a starting time unit of the signal corresponding to all first signal resources and/or all first signal resource sets triggered by the first DCI can be determined based on a time unit where the first DCI is located and the first information indicated by the first DCI.

Based on the foregoing embodiments, S201 can be performed by the following ways but not limited thereto:

S2015: receiving a joint coding result sent by the first device through a second DCI and/or a second MAC-CE, and determining the first information according to the joint coding result; where the joint coding result is a result obtained by jointly coding a trigger message and the first information, and the trigger message is used for triggering the transmission of the signal corresponding to the first signal resource and/or the first signal resource set.

Based on the foregoing embodiments, one or more code points of the signaling used for indicating the joint coding result in S2015 carry both a trigger state and the first information.

Based on the foregoing embodiments, when S2014 is performed, it can include:

S2016: receiving a third DCI sent by the first device, where the third DCI includes trigger signaling for triggering the first signal resource and/or the first signal resource set, and the third DCI is different from the first DCI.

From the above embodiments, the first information and the trigger signaling can be transmitted through different DCIs, which diversifies the implementation manner of the first information transmission and increases the diversity of the first information transmission.

Based on the above embodiments, the method further includes the following steps:

S205: receiving third information sent by the first device, where the third information is used for indicating that whether the first device configures the first information for the second device;

S206: determining that whether the first device configures the first information for the second device according to the third information; and S207: obtaining the first information when it is determined that the first device has configured the first information for the second device.

Based on the above embodiments, the method further includes the following steps:

S208: receiving fourth information sent by the first device, where the fourth information is used for indicating a bit width (or referred to as payload) of the first information; and S209: determining the bit width of the first information according to the fourth information.

In an embodiment, the bit width of the first information can be 0 bits, or 1 bit, 2 bits, 3 bits, and so on.

In an embodiment, when the bit width of the first information is 0, the second offset value is 0.

When S201 is performed, the first information can be determined based on the bit width.

Based on the above embodiments, the method includes the following steps:

receiving second information sent by the first device, where the second information is used for indicating candidate time-domain transmission locations of the signal corresponding to the first signal resource and/or the first signal resource set; and determining candidate time-domain transmission locations of the signal corresponding to the first signal resource and/or the first signal resource set based on the second information;

the determining the time-domain transmission location of the signal corresponding to the first signal resource and/or the first signal resource set based on the first information, includes:

selecting, based on the first information, the time-domain transmission location of the signal corresponding to the first signal resource and/or the first signal resource set from candidate time-domain transmission locations.

In an embodiment, the second device can receive candidate time-domain transmission locations indicated by the first device for the first signal resource and/or the first signal resource set through MAC-CE, and further receive the first information indicated by the first device through DCI, that is, select one from candidate time-domain transmission locations as the actual time-domain transmission location of the signal corresponding to the first signal resource and/or the first signal resource set.

In an embodiment, the first device can indicate candidate time-domain transmission locations for the first signal resource and/or the first signal resource set through RRC signaling, and indicate the first information through the MAC-CE signaling, that is, select one from candidate time-domain transmission locations as the actual time-domain transmission location of the signal corresponding to the first signal resource and/or the first signal resource set.

In an embodiment, the first device can indicate candidate time-domain transmission locations for the first signal resource and/or the first signal resource set through RRC signaling, select multiple candidate time-domain transmission locations through MAC-CE signaling from candidate time-domain transmission locations, and indicate the first information through DCI, that is, select one from the multiple candidate time-domain transmission locations as the actual time-domain transmission location of the signal corresponding to the first signal resource and/or the first signal resource set.

Based on the foregoing embodiments, the second information includes a third time offset value corresponding to each of the candidate time-domain transmission locations and the third time offset value is used for indicating p time units;

the third time offset value can be used for indicating:

a time unit where the candidate time-domain transmission location is located is the p-th available time unit after a third time unit; or a time unit where the candidate time-domain transmission location is located is the $1^{st}$ available time unit after p available time units after a third time unit; or a time unit where the candidate time-domain transmission location is located is the p-th time unit after a third time unit; or a time unit where the candidate time-domain transmission location is located is the $1^{st}$ time unit after p time units after a third time unit; or a time unit where the candidate time-domain transmission location is located is the p-th available time unit counting from a third time unit; or a time unit where the candidate time-domain transmission location is located is the $1^{st}$ available time unit after the p-th available time unit counting from a third time unit; or a time unit where the candidate time-domain transmission location is located is the p-th time unit counting from the third time unit; or a time unit where the candidate time-domain transmission location is located is the $1^{st}$ time unit counting from the (p+1)-th time unit counting from a third time unit; or a starting time unit of the candidate time-domain transmission location is the p-th available time unit after a third time unit; or a starting time unit of the candidate time-domain transmission location is the $1^{st}$ available time unit after p available time units after a third time unit; or a starting time unit of the candidate time-domain transmission location is the p-th time unit after a third time unit; or a starting time unit of the candidate time-domain transmission location is the $1^{st}$ time unit after p time units after a third time unit; or a starting time unit of the candidate time-domain transmission location is the p-th available time unit counting from a third time unit; or a starting time unit of the candidate time-domain transmission location is the $1^{st}$ available time unit after the p-th available time unit counting from a third time unit; or a starting time unit of the candidate time-domain transmission location is the p-th time unit counting from the third time unit; or a starting time unit of the candidate time-domain transmission location is the $1^{st}$ time unit counting from the (p+1)-th time unit counting from a third time unit;

where the third time unit is one of the followings:

a time unit where a third signaling used for triggering the transmission of the signal corresponding to the first signal resource and/or the first signal resource set is located (for example, a time unit where DCI carrying a triggering signaling for the first signal resource and/or the first signal resource set is located, or a time unit where a PDCCH carrying the DCI is located); or a time unit where the signaling for transmitting the first information is located (for example, a time unit where the DCI carrying the first information is located, or a time unit where the PDCCH carrying the DCI is located).

Based on the foregoing embodiments, the time unit is a slot.

Based on the foregoing embodiments, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set (for example, an available uplink slot for one SRS resource set is a slot satisfying: there are available uplink symbols for the time-domain transmission location for all SRS resources in the SRS resource set); or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a downlink control information (DCI) for triggering the transmission of the signal corresponding to the downlink signal resource, and the minimum timing requirement is the one for transmission of the first signal and a DCI triggering the first signal.

For the above embodiments, when determining the time unit where the first signaling for triggering the signal (the first signal) corresponding to the first signal resource and/or the first signal resource set is located, some adjustments or transformations need to be performed. For example, the time unit is adjusted or transformed according to a subcarrier spacing corresponding to the first signal and a subcarrier spacing value of the physical downlink channel carrying the first signaling (for example, the time unit is adjusted or transformed according to the subcarrier spacing corresponding to an SRS and the subcarrier spacing value of the physical downlink control channel (PDCCH) carrying the first signaling used for triggering the transmission of the SRS).

The methods for transmitting signal shown in FIGS. 1 and 2 are described by using the following examples.

Example 1 (Uplink Signal)

Step 1: The base station (the first device) configures one or more aperiodic SRS resource sets for the terminal (the second device), where each SRS resource set includes one or more SRS resources. In a NR system, a SRS resource set whose RRC signaling resource Type is "aperiodic" is an aperiodic SRS resource set.

The base station triggers aperiodic SRS resource sets through a SRS request field in the DCI.

In an embodiment, the DCI carries the first information, and the first information and the SRS request field are different information fields.

In an embodiment, the bit width (or payload) of the first information is M bits, where M is an integer greater than or equal to 0. For example, M=0, or M=1, M=2, M=3, M=4, etc.

In an embodiment, the first information indicates a slot value greater than or equal to 0. Taking M=2 as an example, the corresponding relationship between indication value and slot value of a first information is shown in Table 1 below.

TABLE 1

| Values of first information | Slot values corresponding to first information |
|---|---|
| 00 | 0 |
| 01 | 1 |
| 10 | 2 |
| 11 | 3 |

In an embodiment, the first information only indicates slot values greater than 0. Taking M=2 as an example, the corresponding relationship between indication value and slot value of a first information is shown in Table 2 below.

TABLE 2

| Values of first information | Slot values corresponding to first information |
|---|---|
| 00 | 1 |
| 01 | 2 |
| 10 | 3 |
| 11 | 4 |

In an embodiment, the first information and the trigger signaling for triggering the first signal resource and/or the first signal resource set are carried in different DCIs. For example, trigger signaling for triggering the first signal resource and/or the first signal resource set is carried in DCI format 0_1/0_2/1_1/1_2/2_3, while the first information is carried in DCI format 2_X (X can be a positive integer).

In an embodiment, after the second device receives the first information, it is assumed that the first information is valid within the first time window. The first time window can be:

a time window from the first information being valid to the second device receiving new first information;

a time window from the first information being valid to the second device receiving a signaling for invaliding the first information;

a time window from the first information being valid to the second device receiving a signaling for re-configuring the first signal resource and/or the first signal resource set; or a predefined time window, etc.

The predefined time window can be a time window with a fixed size; or a time window determined according to the number of time units indicated by the first information, etc.

In an embodiment, the first information is carried in trigger signaling. The trigger signaling indicates the first information while triggering the SRS. In an embodiment, some of the multiple states of the trigger signaling trigger the same SRS resources, but different first information. An example is shown in Table 3 below, where the SRS request field is used for both triggering the aperiodic SRS resource set and indicating the first information of the aperiodic SRS resource set triggered by the SRS request field.

TABLE 3

| Values of SRS request field | Triggered aperiodic SRS resource sets and first information |
|---|---|
| 000 | No aperiodic SRS resource set is triggered |
| 001 | Aperiodic SRS resource trigger parameter (such as aperiodicSRS-ResourceTrigger or aperiodicSRS-ResourceTriggerList) SRS resource set configured as 1, the first information is 0 |
| 010 | Aperiodic SRS resource trigger parameter (such as aperiodicSRS-ResourceTrigger or aperiodicSRS-ResourceTriggerList) SRS resource set configured as 1, the first information is 1 |
| 011 | Aperiodic SRS resource trigger parameter (such as aperiodicSRS-ResourceTrigger or aperiodicSRS-ResourceTriggerList) SRS resource set configured as 2, the first information is 0 |
| 100 | Aperiodic SRS resource trigger parameter (such as aperiodicSRS-ResourceTrigger or aperiodicSRS-ResourceTriggerList) SRS resource set configured as 2, the first information is 1 |

TABLE 3-continued

| Values of SRS request field | Triggered aperiodic SRS resource sets and first information |
| --- | --- |
| 101 | Aperiodic SRS resource trigger parameter (such as aperiodicSRS-ResourceTrigger or aperiodicSRS-ResourceTriggerList) SRS resource set configured as 3, the first information is 0 |
| 110 | Aperiodic SRS resource trigger parameter (such as aperiodicSRS-ResourceTrigger or aperiodicSRS-ResourceTriggerList) SRS resource set configured as 3, the first information is 1 |

In an embodiment, different states of trigger signaling trigger different SRS resource sets. An example is shown in Table 4 below.

TABLE 4

| Values of SRS request field | Triggered aperiodic SRS resource sets and first information |
| --- | --- |
| 00 | No aperiodic SRS resource set is triggered |
| 01 | Aperiodic SRS resource trigger parameter (such as aperiodicSRS-ResourceTrigger or aperiodicSRS-ResourceTriggerList) SRS resource set configured as 1, the first information is 0 |
| 10 | Aperiodic SRS resource trigger parameter (such as aperiodicSRS-ResourceTrigger or aperiodicSRS-ResourceTriggerList) SRS resource set configured as 2, the first information is 1 |
| 11 | Aperiodic SRS resource trigger parameter (such as aperiodicSRS-ResourceTrigger or aperiodicSRS-ResourceTriggerList) SRS resource set configured as 3, the first information is 1 |

In an embodiment, it is assumed that the slot value indicated by the first information is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the first information by the following manner: the m-th available uplink slot within a given time window counting from slot n. In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission.

In an embodiment, it is assumed that the slot value indicated by the first information is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the first information by the following manner: the 1st available uplink slot after slot n+m. In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission.

In an embodiment, it is assumed that the slot value indicated by the first information is m (m is an integer and is an integer greater than or equal to 0 in an embodiment).

When the base station indicates the first information in slot n through the DCI, the second device determines the transmission slots of all SRS resources in the SRS resource set corresponding to the first information by the following manner: the m-th available uplink slot within a given time window counting from slot n. In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission.

In an embodiment, it is assumed that the slot value indicated by the first information is m (m is an integer and is an integer greater than or equal to 0 in an embodiment). When the base station indicates the first information in slot n through the DCI, the second device determines the transmission slots of all SRS resources in the SRS resource set corresponding to the first information by the following manner: the 1st available uplink slot counting from slot n+m. In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, an available uplink slot is a slot that can be used for uplink transmission.

In an embodiment, it is assumed that the slot value indicated by the first information is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the first information by the following manner:

the m-th available uplink slot within a given time window counting from slot $$\left\lfloor n \times \frac{2^{\mu_{SRS}}}{2^{\mu_{PDCCH}}} \right\rfloor.$$

In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission. Where $\mu_{SRS}$ and $\mu_{PDCCH}$ are the subcarrier spacing values of the triggered SRS and the PDCCH carrying the trigger signaling, respectively.

In an embodiment, it is assumed that the slot value indicated by the first information is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the first information by the following manner:

the $1^{st}$ available uplink slot counting from slot $$\left\lfloor n \times \frac{2^{\mu_{SRS}}}{2^{\mu_{PDCCH}}} \right\rfloor + m.$$

In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission. Where $\mu_{SRS}$ and $\mu_{PDCCH}$ are the subcarrier spacing values of the triggered SRS and the PDCCH carrying the trigger signaling, respectively.

In an embodiment, it is assumed that the slot value indicated by the first information is m (m is an integer and is an integer greater than or equal to 0 in an embodiment). When the base station indicates the first information in slot n through the DCI, the second device determines the transmission slots of all SRS resources in the SRS resource set corresponding to the first information by the following manner:

the m-th available uplink slot within a given time window counting from slot $$\left\lfloor n \times \frac{2^{\mu_{SRS}}}{2^{\mu_{PDCCH}}} \right\rfloor.$$

In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission. Where $\mu_{SRS}$ and $\mu\mu_{PDCCH}$ are the subcarrier spacing values of the triggered SRS and the PDCCH carrying the first information, respectively.

In an embodiment, it is assumed that the slot value indicated by the first information is m (m is an integer and is an integer greater than or equal to 0 in an embodiment). When the base station indicates the first information in slot n through the DCI, the second device determines the transmission slots of all SRS resources in the SRS resource set corresponding to the first information by the following manner:

the $1^{st}$ available uplink slot counting from slot $$\left\lfloor n \times \frac{2^{\mu_{SRS}}}{2^{\mu_{PDCCH}}} \right\rfloor + m.$$

In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission. Where $\mu_{SRS}$ and $\mu_{PDCCH}$ are the subcarrier spacing values of the triggered SRS and the PDCCH carrying the first information, respectively.

In an embodiment, the second device transmits the SRS resources in the first SRS resource set in the determined slot.

Example 2 (Downlink Signal)

Step 1: The base station (the first device) configures one or more aperiodic CSI-RS resource sets for the terminal (the second device), where each CSI-RS resource set includes one or more CSI-RS resources. In a NR system, a CSI-RS resource set whose RRC signaling resourceType is "aperiodic" is an aperiodic CSI-RS resource set. The base station configures one or more trigger states and time offset values (first offset signalings) for each CSI-RS resource set. In an embodiment, the base station can indicate whether the DCI includes the first information through higher layer signaling (e.g., RRC signaling). The higher layer signaling is used for indicating the first information.

The base station triggers aperiodic CSI-RS resource sets through CSI request field in the DCI.

In an embodiment, if the DCI includes the first information, the first information and the CSI request field are different information fields.

In an embodiment, the bit width (or payload) of the first information is M bits, where M is an integer greater than or equal to 0. For example, M=0, or M=1, M=2, M=3, M=4, etc.

In an embodiment, the first information indicates a slot value greater than or equal to 0. Taking M=2 as an example, the corresponding relationship between the indication value and the slot value of a first information is shown in Table 1 above.

In an embodiment, the first information only indicates slot values greater than 0. Taking M=2 as an example, the corresponding relationship between the indication value and the slot value of a first information is shown in Table 2 above.

In an embodiment, the higher layer signaling for indicating the first information and the trigger signaling for triggering the first signal resource and/or the first signal resource set are carried in different DCIs. For example, trigger signaling for triggering the first signal resource and/or the first signal resource set is carried in DCI format 0_1/0_2/1_1/1_2/2_3, while the higher layer signaling is carried in DCI format 2 X.

In an embodiment, after the second device receives the first information, it is assumed that the first information is valid within the first time window. The first time window can be:
- a time window from the first information being valid to the second device receiving new first information;
- a time window from the first information being valid to the second device receiving a signaling for invaliding the first information;
- a time window from the first information being valid to the second device receiving a signaling for re-configuring the first signal resource and/or the first signal resource set; or
- a predefined time window, etc.

The predefined time window can be a time window with a fixed size; or a time window determined according to the offset value indicated by the first offset signaling; or a time window determined according to the first information, etc.

In an embodiment, the first information is carried in trigger signaling. The trigger signaling indicates the first information while triggering the CSI-RS. In an embodiment, some of the multiple states of the trigger signaling trigger the same CSI-RS resources, but different first information. Examples are shown as follows, where the CSI request field is used for both triggering the aperiodic CSI-RS resource set and indicating the first information of the aperiodic CSI-RS resource set triggered by the CSI-RS request field.

In an embodiment, different states of trigger signaling trigger different CSI-RS resources.

In an embodiment, it is assumed that the slot value indicated by the first information is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the first information by the following manner: the m-th available downlink slot within a given time window counting from slot n. In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission.

In an embodiment, it is assumed that the slot value indicated by the first information is m (m is an integer and is an integer greater than or equal to 0 in an embodiment).

When the base station triggers the aperiodic CSI-RS in slot n through the CSI request field in DCI, the second device determines the transmission slots of all CSI-RS resources in the CSI-RS resource set corresponding to the first information by the following manner: the $1^{st}$ available downlink slot counting from slot n+m. In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission.

In an embodiment, it is assumed that the slot value indicated by the first information is m (m is an integer and is an integer greater than or equal to 0 in an embodiment). When the base station indicates the first information in slot n through the DCI, the second device determines the transmission slots of all CSI-RS resources in the CSI-RS resource set corresponding to the first information by the following manner: the m-th available downlink slot within a given time window counting from slot n. In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission.

In an embodiment, it is assumed that the slot value indicated by the first information is m (m is an integer and is an integer greater than or equal to 0 in an embodiment). When the base station indicates the first information in slot n through the DCI, the second device determines the transmission slots of all CSI-RS resources in the CSI-RS resource set corresponding to the first information by the following manner: the $1^{st}$ available downlink slot counting from slot n+m. In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission.

In an embodiment, it is assumed that the slot value indicated by the first information is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the first information by the following manner:

the m-th available downlink slot within a given time window counting from slot $$n \times \frac{2^{\mu_{CSI-RS}}}{2^{\mu_{PDCCH}}}.$$

In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission. Where $\mu_{CSI\text{-}RS}$ and $\mu_{PDCCH}$ are the subcarrier spacing values of the triggered CSI-RS and the PDCCH carrying the trigger signaling, respectively.

In an embodiment, it is assumed that the slot value indicated by the first information is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the first information by the following manner:

the $1^{st}$ available downlink slot counting from slot $$n \times \frac{2^{\mu_{CSI\text{-}RS}}}{2^{\mu_{PDCCH}}} + m.$$

In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission. Where $\mu_{CSI\text{-}RS}$ and $\mu_{PDCCH}$ are the subcarrier spacing values of the triggered CSI-RS and the PDCCH carrying the trigger signaling, respectively.

In an embodiment, it is assumed that the slot value indicated by the first information is m (m is an integer and is an integer greater than or equal to 0 in an embodiment). When the base station indicates the first information in slot n through the DCI, the second device determines the transmission slots of all CSI-RS resources in the CSI-RS resource set corresponding to the first information by the following manner:

the m-th available downlink slot within a given time window counting from slot $$n \times \frac{2^{\mu_{CSI\text{-}RS}}}{2^{\mu_{PDCCH}}}.$$

In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available slot is a slot that can be used for downlink transmission. Where $\mu_{CSI\text{-}RS}$ and $\mu_{PDCCH}$ are the subcarrier spacing values of the triggered CSI-RS and the PDCCH carrying the first information, respectively.

In an embodiment, it is assumed that the slot value indicated by the first information is m (m is an integer and is an integer greater than or equal to 0 in an embodiment). When the base station indicates the first information in slot n through the DCI, the second device determines the transmission slots of all CSI-RS resources in the CSI-RS resource set corresponding to the first information by the following manner:

the $1^{st}$ available downlink slot counting from slot $$\left\lfloor n \times \frac{2^{\mu_{CSI\text{-}RS}}}{2^{\mu_{PDCCH}}} \right\rfloor + m.$$

In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission. Where $\mu_{CSI\text{-}RS}$ and $\mu_{PDCCH}$ are the subcarrier spacing values of the triggered CSI-RS and the PDCCH carrying the first information, respectively.

In an embodiment, the second device receives the CSI-RS resources in the first CSI-RS resource set in the determined slot.

Example 3 (Uplink Signal)

Step 1: The base station (the first device) configures one or more aperiodic SRS resource sets for the terminal (the second device), where each SRS resource set includes one or more SRS resources. In a NR system, a SRS resource set whose RRC signaling resourceType is "aperiodic" is an aperiodic SRS resource set. The base station configures one or more trigger states and time offset values (first offset signalings) for each SRS resource set. In an embodiment, the base station can indicate whether the DCI includes a second offset signaling through higher layer signaling (e.g., RRC signaling). The second offset signaling is used for indicating a second offset value.

The base station triggers aperiodic SRS resource sets through a SRS request field in the DCI.

In an embodiment, if the DCI includes the second offset signaling, the second offset signaling and the SRS request field are different information fields.

In an embodiment, the bit width (or payload) of the second offset signaling is M bits, where M is an integer greater than or equal to 0. For example, M=0, or M=1, M=2, M=3, M=4, etc.

In an embodiment, the second offset signaling indicates a slot offset value greater than or equal to 0. Taking M=2 as an example, the corresponding relationship between the indication value and the slot offset value of the second offset signaling is shown in Table 5 below.

TABLE 5

| Values of second offset value | Slot offset values corresponding to second offset value |
|---|---|
| 00 | 0 |
| 01 | 1 |
| 10 | 2 |
| 11 | 3 |

In an embodiment, the second offset signaling only indicates a slot offset value greater than 0. Taking M=2 as an example, the corresponding relationship between the indication value and the slot offset value of the second offset signaling is shown in Table 6 below.

TABLE 6

| Values of second offset value | Slot offset values corresponding to second offset value |
|---|---|
| 00 | 1 |
| 01 | 2 |
| 10 | 3 |
| 11 | 4 |

In an embodiment, the second offset signaling for indicating the second offset value and the trigger signaling for triggering the first signal resource and/or the first signal resource set are carried in different DCIs. For example, trigger signaling for triggering the first signal resource and/or the first signal resource set is carried in DCI format 0_1/0_2/1_1/1_2/2_3, while the second offset signaling is carried in DCI format 2 X.

In an embodiment, after the second device receives the second offset signaling, it is assumed that the second offset signaling is valid within the first time window. The first time window can be:

- a time window from the second offset signaling being valid to the second device receiving a new second offset signaling; or
- a time window from the second offset signaling being valid to the second device receiving a signaling for invaliding the second offset signaling; or
- a time window from the second offset signaling being valid to the second device receiving a signaling for re-configuring the first signal resource and/or the first signal resource set; or
- a predefined time window, etc.

The predefined time window can be a time window with a fixed size; or a time window determined according to the offset value indicated by the first offset signaling; or a time window determined according to the second offset value, etc.

In an embodiment, the second offset value is carried in trigger signaling. The trigger signaling indicates the second offset value while triggering the SRS. In an embodiment, some of the multiple states of the trigger signaling trigger the same SRS resources, but different second offset values. An example is shown in Table 3 above, where the SRS request field is used for both triggering the aperiodic SRS resource set and indicating the second offset value of the aperiodic SRS resource set triggered by the SRS request field.

In an embodiment, different states of trigger signaling trigger different SRS resources. An example is shown in Table 4 above.

In an embodiment, it is assumed that the slot offset value indicated by the second offset signaling is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the slot offset value k indicated by the first offset signaling by the following formula:

$$\left\lfloor n \times \frac{2^{\mu_{SRS}}}{2^{\mu_{PDCCH}}} \right\rfloor + k + m,$$

where $\mu_{SRS}$ and $\mu_{PDCCH}$ are the subcarrier spacing values of the triggered SRS and the PDCCH carrying the trigger signaling, respectively.

In an embodiment, it is assumed that the slot offset value indicated by the second offset signaling is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the slot offset value k indicated by the first offset signaling by the following manner: the (k+m)-th available uplink slot within a given time window counting from slot n. In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission.

In an embodiment, it is assumed that the slot offset value indicated by the second offset signaling is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the slot offset value k indicated by the first offset signaling by the following manner:

the (k+m)-th available uplink slot within a given time window counting from slot $$\left\lfloor n \times \frac{2^{\mu_{SRS}}}{2^{\mu_{PDCCH}}} \right\rfloor.$$

In an embodiment, the available uplink slot of an SRS resource set is a slot satisfying: a minimum timing requirement between the time-domain location of the PDCCH for triggering the aperiodic SRS and the time-domain location for sending the aperiodic SRS and there are available uplink symbols for the time-domain transmission location for all SRS resources in the SRS resource set. In an embodiment, the given time window is 10(k+1). In an embodiment, the available uplink slot is a slot that can be used for uplink transmission.

In an embodiment, it is assumed that the slot offset value indicated by the second offset signaling is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the slot offset value k indicated by the first offset signaling by the following manner:

the $1^{st}$ available uplink slot having a slot number equal to or greater than $$\left\lfloor n \times \frac{2^{\mu_{SRS}}}{2^{\mu_{PDCCH}}} \right\rfloor + k + m.$$

In an embodiment, the available uplink slot for an SRS resource set is a slot satisfying: there are available uplink symbols for the time-domain transmission location for all SRS resources in the SRS resource set. In an embodiment, the given time window is 10(k+1). In an embodiment, the available uplink slot is a slot that can be used for uplink transmission.

In an embodiment, it is assumed that the slot offset value indicated by the second offset signaling is m (m is an integer and is an integer greater than or equal to 0 in an embodiment). When the base station triggers the aperiodic SRS in slot n through the SRS request field in DCI, the second device determines the transmission slots of all SRS resources in the SRS resource set corresponding to the slot offset value k indicated by the first offset signaling by the following manner:

the (1+m)-th available uplink slot having a slot number equal to or greater than $$\left\lfloor n \times \frac{2^{\mu_{SRS}}}{2^{\mu_{PDCCH}}} \right\rfloor + k.$$

In an embodiment, the available uplink slot for an SRS resource set is a slot satisfying: there are available uplink symbols for the time-domain transmission location for all SRS resources in the SRS resource set. In an embodiment, the given time window is 10(k+1). In an embodiment, the available uplink slot is a slot that can be used for uplink transmission.

In an embodiment, the second device transmits the SRS resources in the first SRS resource set in the determined slot.

Example 4 (Downlink Signal)

Step 1: The base station (the first device) configures one or more aperiodic CSI-RS resource sets for the terminal (the second device), where each CSI-RS resource set includes one or more CSI-RS resources. In a NR system, the CSI-RS resource set whose RRC signaling resourceType is "aperiodic" is an aperiodic CSI-RS resource set. The base station configures one or more trigger states and time offset values (first offset signaling) for each CSI-RS resource set. In an embodiment, the base station can indicate whether the DCI includes a second offset signaling through higher layer signaling (e.g., RRC signaling). The second offset signaling is used for indicating a second offset value.

The base station triggers aperiodic CSI-RS resource sets through a CSI request field in the DCI.

In an embodiment, if the DCI includes the second offset signaling, the second offset signaling and the CSI request field are different information fields.

In an embodiment, the bit width (or payload) of the second offset signaling is M bits, where M is an integer greater than or equal to 0. For example, M=0, or M=1, M=2, M=3, M=4, etc.

In an embodiment, the second offset signaling indicates a slot offset value greater than or equal to 0. Taking M=2 as an example, the corresponding relationship between the indication value and the slot offset value of the second offset signaling is shown in Table 5 above.

In an embodiment, the second offset signaling only indicates a slot offset value greater than 0. Taking M=2 as an example, the corresponding relationship between the indication value and the slot offset value of the second offset signaling is shown in Table 6 above.

In an embodiment, the second offset signaling for indicating the second offset value and the trigger signaling for triggering the first signal resource and/or the first signal resource set are carried in different DCIs. For example, trigger signaling for triggering the first signal resource and/or the first signal resource set is carried in DCI format 0_1/0_2/1_1/1_2/2_3, while the second offset signaling is carried in DCI format 2 X.

In an embodiment, after the second device receives the second offset signaling, it is assumed that the second offset signaling is valid within the first time window. The first time window can be:

a time window from the second offset signaling being valid to the second device receiving a new second offset signaling; or a time window from the second offset signaling being valid to the second device receiving a signaling for invaliding the second offset signaling; or a time window from the second offset signaling being valid to the second device receiving a signaling for re-configuring the first signal resource and/or the first signal resource set; or a predefined time window, etc.

The predefined time window can be a time window with a fixed size; or a time window determined according to the offset value indicated by the first offset signaling; or a time window determined according to the second offset value, etc.

In an embodiment, the second offset value is carried in the trigger signaling. The trigger signaling indicates the second offset value while triggering the CSI-RS. In an embodiment, some of the multiple states of the trigger signaling trigger the same CSI-RS resources, but different second offset values. Examples are shown as follows, where the CSI request field is used for both triggering the aperiodic CSI-RS resource set and indicating the second offset value of the aperiodic CSI-RS resource set triggered by the CSI-RS request field:

In an embodiment, different states of trigger signaling trigger different CSI-RS resources.

In an embodiment, it is assumed that the slot offset value indicated by the second offset signaling is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the slot offset value k indicated by the first offset signaling by the following formula:

$$\left\lfloor n \times \frac{2^{\mu_{CSI-RS}}}{2^{\mu_{PDCCH}}} \right\rfloor + k + m,$$

where $\mu_{CSI-RS}$ and $\mu_{PDCCH}$ are the subcarrier spacing values of the triggered CSI-RS and the PDCCH carrying the trigger signaling, respectively.

In an embodiment, it is assumed that the slot offset value indicated by the second offset signaling is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the slot offset value k indicated by the first offset signaling by the following manner: the (k+m)-th available downlink slot within a given time window counting from slot n. In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission.

In an embodiment, it is assumed that the slot offset value indicated by the second offset signaling is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the slot offset value k indicated by the first offset signaling by the following manner:

the (k+m)-th available downlink slot within a given time window from slot $$
\left\lfloor n \times \frac{2^{\mu_{CSI-RS}}}{2^{\mu_{PDCCH}}} \right\rfloor.
$$

In an embodiment, the available downlink slot of a CSI-RS resource set is a slot satisfying: a minimum timing requirement between the time-domain location of the PDCCH for triggering the aperiodic CSI-RS and the time-domain location for sending the aperiodic CSI-RS and there are available downlink symbols for the time-domain transmission location for all CSI-RS resources in the CSI-RS resource set. In an embodiment, the given time window is 10(k+1). In an embodiment, the available downlink slot is a slot that can be used for downlink transmission. Where $\mu_{CSI-RS}$ and $\mu_{PDCCH}$ are the subcarrier spacing values of the triggered CSI-RS and the PDCCH carrying the trigger signaling, respectively.

In an embodiment, it is assumed that the slot offset value indicated by the second offset signaling is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the slot offset value k indicated by the first offset signaling by the following manner:

the 1$^{st}$ available downlink slot having a slot number equal to or greater than $$
\left\lfloor n \times \frac{2^{\mu_{CSI-RS}}}{2^{\mu_{PDCCH}}} \right\rfloor + k + m.
$$

In an embodiment, the available downlink slot for a CSI-RS resource set is a slot satisfying: there are available downlink symbols for the time-domain transmission location for all CSI-RS resources in the CSI-RS resource set. In an embodiment, the given time window is 10(k+1). In an embodiment, the available downlink slot is a slot that can be used for downlink transmission. Where $\mu_{CSI-RS}$ and $\mu_{PDCCH}$ are the subcarrier spacing values of the triggered CSI-RS and the PDCCH carrying the trigger signaling, respectively.

In an embodiment, it is assumed that the slot offset value indicated by the second offset signaling is m (m is an integer and is an integer greater than or equal to 0 in an embodiment). When the base station triggers the aperiodic CSI-RS in slot n through the CSI request field in DCI, the second device determines the transmission slots of all CSI-RS resources in the CSI-RS resource set corresponding to the slot offset value k indicated by the first offset signaling by the following manner:

the (1+m)-th available downlink slot having a slot number equal to or greater than $$
\left\lfloor n \times \frac{2^{\mu_{CSI-RS}}}{2^{\mu_{PDCCH}}} \right\rfloor + k.
$$

In an embodiment, the available downlink slot for a CSI resource set is a slot satisfying: there are available downlink symbols for the time-domain transmission location for all CSI-RS resources in the CSI-RS resource set. In an embodiment, the given time window is 10(k+1). In an embodiment, the available downlink slot is a slot that can be used for downlink transmission. Where $\mu_{CSI-RS}$ and $\mu_{PDCCH}$ are the subcarrier spacing values of the triggered CSI-RS and the PDCCH carrying the trigger signaling, respectively.

In an embodiment, the second device receives the CSI-RS resources in the first CSI-RS resource set in the determined slot.

FIG. 3 is a schematic block diagram showing an apparatus for transmitting signal according to an embodiment of the present application. The apparatus can be applied to a first device, such as a network side device. As shown in FIG. 3, the apparatus can include:

a configuring device 31, used for configuring first information for a second device, where the first information is used for indicating a time-domain transmission location of a signal corresponding to a first signal resource and/or a first signal resource set; and a sending device 32, used for sending the first information to the second device through signaling.

In an embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value.

In an embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The sending device 32 is further used for:

sending first offset signaling for indicating the setting offset value to the second device.

In an embodiment, the configuring device 31 is further used for:

configuring the first information for each of one or more first signal resources; or configuring the first information for each of one or more first signal resource sets; or configuring a common first information for all the first signal resources and/or all the first signal resource sets triggered or activated by a same signaling.

In an embodiment, the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

In an embodiment, the first offset value is used for indicating m time units, where m is a first number;

a time unit where the time-domain transmission location is located is the m-th available time unit after a first time unit; or a time unit where the time-domain transmission location is located is the $1^{st}$ available time unit after m available time units after a first time unit; or a time unit where the time-domain transmission location is located is the m-th time unit after a first time unit; or a time unit where the time-domain transmission location is located is the $1^{st}$ time unit after m time units after a first time unit; or a time unit where the time-domain transmission location is located is the m-th available time unit counting from a first time unit; or a time unit where the time-domain transmission location is located is the $1^{st}$ available time unit after the m-th available time unit counting from a first time unit; or a time unit where the time-domain transmission location is located is the m-th time unit counting from a first time unit; or a time unit where the time-domain transmission location is located is the $1^{st}$ time unit counting from the (m+1)-th time unit counting from a first time unit; or a starting time unit of the time-domain transmission location is the m-th available time unit after a first time unit; or a starting time unit of the time-domain transmission location is the $1^{st}$ available time unit after m available time units after a first time unit; or a starting time unit of the time-domain transmission location is the m-th time unit after a first time unit; or a starting time unit of the time-domain transmission location is the $1^{st}$ time unit after m time units after a first time unit; or a starting time unit of the time-domain transmission location is the m-th available time unit counting from a first time unit; or a starting time unit of the time-domain transmission location is the $1^{st}$ available time unit after the m-th available time unit counting from a first time unit; or a starting time unit of the time-domain transmission location is the m-th time unit counting from a first time unit; or a starting time unit of the time-domain transmission location is the $1^{st}$ time unit counting from the (m+1)-th time unit counting from a first time unit.

In an embodiment, the first time unit is one of the followings:

a time unit where first signaling is located, where the first signaling is used for triggering a transmission of the signal corresponding to the first signal resource and/or the first signal resource set; or a time unit where a signaling for transmitting the first information is located.

In an embodiment, the setting offset value is used for indicating k time units; and the second offset value is used for indicating t time units, where k is a second number and t is a third number;

a time unit where the time-domain transmission location is located is the t-th available time unit counting from the (k+1)-th time unit after a second time unit; or a time unit where the time-domain transmission location is located is the $1^{st}$ available time unit after t available time units counting from the (k+1)-th time unit counting from a second time unit; or a time unit where the time-domain transmission location is located is the (k+t)-th time unit after a second time unit; or a time unit where the time-domain transmission location is located is the $1^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the $1^{st}$ available time unit after t available time units after the k-th time unit counting from a second time unit; or a time unit where the time-domain transmission location is located is the (t+k)-th time unit counting from a second time unit; or a time unit where the time-domain transmission location is located is the $1^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the $1^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the $1^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the $1^{st}$ available time unit after t available time units after the k-th time unit counting from a second time unit; or a starting time unit of the time-domain transmission location is the (t+k)-th time unit counting from a second time unit; or a starting time unit of the time-domain transmission location is the $1^{st}$ time unit counting from the (k+t+1) time units counting from a second time unit.

In an embodiment, the second time unit is one of the followings:

a time unit where second signaling is located, where the second signaling is used for triggering a transmission of the signal corresponding to the first signal resource and/or the first signal resource set; or a time unit where a signaling for transmitting the first information is located.

In an embodiment, the second offset value is valid within a first time window;

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In an embodiment, the configuring device 31 is further used for: configuring second information for the second device, where the second information is used for indicating candidate time-domain transmission locations of the signal corresponding to the first signal resource and/or the first signal resource set; and the sending device is further used for sending the first information to the second device through signaling.

The first information is used for indicating the time-domain transmission location of the signal corresponding to the first signal resource and/or the first signal resource set, includes:

the first information is used for selecting the time-domain transmission location of the signal corresponding to the first signal resource and/or the first signal resource set from candidate time-domain transmission locations.

In an embodiment, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a downlink control information (DCI) for triggering the transmission of the signal corresponding to the downlink signal resource, and the minimum timing requirement is the one for transmission of the first signal and a DCI triggering the first signal.

In an embodiment, the sending device 32 is further used for:

sending the first information to the second device through a first DCI and/or a first medium access control layer-control element (MAC-CE); or sending a joint coding result to the second device through a second DCI and/or a second MAC-CE;

where a DCI format of the first DCI is a DCI format for carrying the first information; and/or the first DCI includes an information field for carrying the first information; and the joint coding result is a result obtained by jointly coding a trigger message and the first information and the trigger message is used for triggering the transmission of the signal corresponding to the first signal resource and/or the first signal resource set.

In an embodiment, the configuring device 31 is further used for:

configuring third information for the second device, where the third information is used for indicating that whether the first device configures the first information for the second device; and/or configuring fourth information for the second device, where the fourth information is used for indicating a bit width of the first information.

It should be noted here that the apparatus according to the present embodiment can perform all steps of the method embodiments for the first device and achieve the same beneficial effects, and the same steps of the method and the same beneficial effects in the apparatus embodiments will not be repeated here.

FIG. 4 is a schematic block diagram showing an apparatus for transmitting signal according to an embodiment of the present application. The apparatus can be applied to a second device, such as a terminal. As shown in FIG. 4, the apparatus can include:

a receiving device 41, used for receiving first information sent by a first device through signaling, where the first information is used for indicating a time-domain transmission location of a signal corresponding to a first signal resource and/or a first signal resource set; and a determining device 42, used for determining the time-domain transmission location of the signal corresponding to the first signal resource and/or the first signal resource set based on the first information.

In an embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value;

the determining the time-domain transmission location of the signal corresponding to the first signal resource and/or the first signal resource set based on the first information, includes:

determining the time-domain transmission location based on the first offset value, or the first offset value and the first signal transmission mode.

In an embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The receiving device 41 is further used for:

receiving first offset signaling sent by the first device and used for indicating the setting offset value;

the determining the time-domain transmission location of the signal corresponding to the first signal resource and/or the first signal resource set based on the first information, includes:

determining the time-domain transmission location based on the second offset value and the setting offset value, or based on the second offset value and the second signal transmission mode.

In an embodiment, the receiving device 41 is further used for:

sending the signal corresponding to the first signal resource and/or the first signal resource set at the time-domain transmission location; or receiving the signal corresponding to the first signal resource and/or the first signal resource set at the time-domain transmission location.

In an embodiment, the receiving device 41 is further used for:

receiving the first information configured by the first device for each of one or more first signal resources; or receiving the first information configured by the first device for each of one or more first signal resource sets; or receiving a common first information configured by the first device for all the first signal resources and/or all the first signal resource sets triggered or activated by a same signaling.

In an embodiment, the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

In an embodiment, the first offset value is used for indicating m time units, where m is a first number;

the determining the time-domain transmission location based on the first offset value, or the first offset value and the first signal transmission mode, includes:

determining, based on the first offset value, or the first offset value and the first signal transmission mode, the time-domain transmission location satisfying one of the following cases:

a time unit where the time-domain transmission location is located is the m-th available time unit after a first time unit; or a time unit where the time-domain transmission location is located is the $1^{st}$ available time unit after m available time units after a first time unit; or a time unit where the time-domain transmission location is located is the m-th time unit after a first time unit; or a time unit where the time-domain transmission location is located is the $1^{st}$ time unit after m time units after a first time unit; or a time unit where the time-domain transmission location is located is the m-th available time unit counting from a first time unit; or a time unit where the time-domain transmission location is located is the $1^{st}$ available time unit after the m-th available time unit counting from a first time unit; or a time unit where the time-domain transmission location is located is the m-th time unit counting from a first time unit; or a time unit where the time-domain transmission location is located is the $1^{st}$ time unit counting from the (m+1)-th time unit counting from a first time unit; or a starting time unit of the time-domain transmission location is the m-th available time unit after a first time unit; or a starting time unit of the time-domain transmission location is the $1^{st}$ available time unit after m available time units after a first time unit; or a starting time unit of the time-domain transmission location is the m-th time unit after a first time unit; or a starting time unit of the time-domain transmission location is the $1^{st}$ time unit after m time units after a first time unit; or a starting time unit of the time-domain transmission location is the m-th available time unit counting from a first time unit; or a starting time unit of the time-domain transmission location is the $1^{st}$ available time unit after the m-th available time unit counting from a first time unit; or a starting time unit of the time-domain transmission location is the m-th time unit counting from a first time unit; or a starting time unit of the time-domain transmission location is the $1^{st}$ time unit counting from the (m+1)-th time unit counting from a first time unit.

In an embodiment, the first time unit is one of the followings:

a time unit where first signaling is located, where the first signaling is used for triggering a transmission of the signal corresponding to the first signal resource and/or the first signal resource set; or a time unit where a signaling for transmitting the first information is located.

In an embodiment, the setting offset value is used for indicating k time units; and the second offset value is used for indicating t time units, where k is a second number and t is a third number;

the determining the time-domain transmission location based on the second offset value and the setting offset value, or based on the second offset value and a second signal transmission mode, includes:

determining, based on the second offset value and the setting offset value, or the second offset value and the second signal transmission mode, the time-domain transmission location satisfying one of the following cases:

a time unit where the time-domain transmission location is located is the t-th available time unit counting from the (k+1)-th time unit after a second time unit; or a time unit where the time-domain transmission location is located is the $1^{st}$ available time unit after t available time units counting from the (k+1)-th time unit counting from a second time unit; or a time unit where the time-domain transmission location is located is the (k+t)-th time unit after a second time unit; or a time unit where the time-domain transmission location is located is the 1$^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the 1$^{st}$ available time unit after t available time units after the k-th time unit counting from a second time unit; or a time unit where the time-domain transmission location is located is the (t+k)-th time unit counting from a second time unit; or a time unit where the time-domain transmission location is located is the 1$^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the 1$^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the 1$^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the 1$^{st}$ available time unit after t available time units after the k-th time unit counting from a second time unit; or a starting time unit of the time-domain transmission location is the (t+k)-th time unit counting from a second time unit; or a starting time unit of the time-domain transmission location is the 1$^{st}$ time unit counting from the (k+t+1) time units counting from a second time unit.

In an embodiment, the second time unit is one of the followings:

a time unit where second signaling is located, where the second signaling is used for triggering a transmission of the signal corresponding to the first signal resource and/or the first signal resource set; or a time unit where a signaling for transmitting the first information is located.

In an embodiment, the second offset value is valid within a first time window;

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In an embodiment, the receiving device 41 is further used for:

receiving second information sent by the first device, where the second information is used for indicating candidate time-domain transmission locations of the signal corresponding to the first signal resource and/or the first signal resource set; and determining candidate time-domain transmission locations of the signal corresponding to the first signal resource and/or the first signal resource set based on the second information;

the determining the time-domain transmission location of the signal corresponding to the first signal resource and/or the first signal resource set based on the first information, includes:

selecting, based on the first information, the time-domain transmission location of the signal corresponding to the first signal resource and/or the first signal resource set from candidate time-domain transmission locations.

In an embodiment, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the down-link signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a down-link control information (DCI) for triggering the trans-mission of the signal corresponding to the downlink signal resource, and the minimum timing requirement is the one for transmission of the first signal and a DCI triggering the first signal.

In an embodiment, the receiving the first information sent by the first device through the signaling, includes:

receiving the first information sent by the first device through a first DCI and/or a first medium access control layer-control element (MAC-CE); or receiving a joint coding result sent by the first device through a second DCI and/or a second MAC-CE, and determining the first information based on the joint coding result;

where a DCI format of the first DCI is a DCI format for carrying the first information; and/or the first DCI includes an information field for carrying the first information; and the joint coding result is a result obtained by jointly coding a trigger message and the first information and the trigger message is used for triggering the transmis-sion of the signal corresponding to the first signal resource and/or the first signal resource set.

The determining device is further used for:

obtaining third information configured by the first device for the second device, where the third information is used for indicating whether the first device configures the first information for the second device; determining that whether the first device configures the first infor-mation for the second device according to the third information; and obtaining the first information when it is determined that the first device has configured the first information for the second device; and/or obtaining fourth information configured by the first device for the second device, where the fourth information is used for indicating a bit width of the first information; determining the bit width of the first information according to the fourth information; and determining the first information based on the bit width.

It should be noted here that the apparatus according to the present embodiment can perform all steps of the method embodiments for the second device and achieve the same beneficial effects, and the same steps of the method and the same beneficial effects in the apparatus embodiments will not be repeated here.

Figure 5:
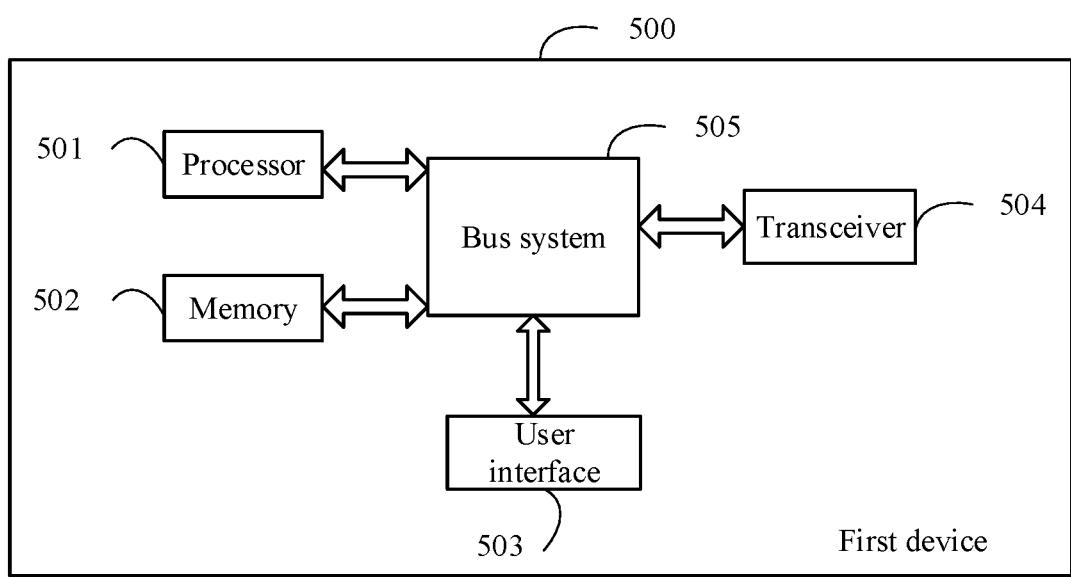
FIG. 5 is a schematic structural diagram of a first device according to an embodiment of the present application.

FIG. 5 is a schematic structural diagram of a first device, such as a network side device, according to an embodiment of the present application. As shown in FIG. 5, the first device can include at least one processor 501, a memory 502, at least one other user interface 503 and a transceiver 504. Various components in the first device 500 are coupled together through the bus system 505. In an embodiment, the bus system 505 is used to connect and communicate between these components. In addition to the data bus, the bus system 505 also includes a power bus, a control bus and a status signal bus. However, for the sake of clarity, respective buses are labeled as the bus system 505 in FIG. 5, and the bus system can include any number of interconnected buses and bridges, which can be linked together through various circuits of one or more processors represented by processor 501 and one or more memories represented by the memory 502. The bus system can also link together various other circuits, such as peripherals, voltage regulators, and power management circuits, which are well known in the art, and therefore will not be further described in the embodiments of the present application. The bus interface provides an interface. Transceiver 504 can be a number of elements, including a transmitter and a receiver, that provide a means for communicating with various other devices over a transmission medium. For different user equipment, the user interface 503 can also be an interface for externally or internally connecting the required equipment, and the connected equipment includes, but not limited to, a keypad, a display, a speaker, a microphone, a joystick, and the like.

In an embodiment, the memory 502 in the embodiments of the present application can be a volatile memory or a non-volatile memory, or can include both volatile and non-volatile memory. The non-volatile memory can be read-only memory (ROM), programmable read-only memory (PROM), erasable programmable read-only memory (Erasable PROM, EPROM), electrically erase programmable read-only memory (Electrically EPROM, EEPROM) or flash memory. The volatile memory can be random access memory (RAM), which is used as an external cache. By way of example but not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM).

The memory 502 of the systems and methods described in various embodiments of the present application is intended to include, but not be limited to, these and any other suitable types of memory.

The processor 501 is used for managing the bus system and general processing, and the memory 502 can store computer programs or instructions used by the processor 501 when performing operations. In an embodiment, the programs can cause the processor 501 to perform the steps of:

configuring first information for a second device, where the first information is used for indicating a time-domain transmission location of a signal corresponding to a first signal resource and/or a first signal resource set; and sending the first information to the second device through signaling.

The methods disclosed in the above embodiments of the present application can be applied to the processor 501 or implemented by the processor 501. The processor 501 can be an integrated circuit chip with signal processing capability. In the implementation process, each step of the above methods can be completed by an integrated logic circuit of hardware in the processor 501 or an instruction in the form of software. The above processor 501 can be a general purpose processor, a digital signal processor (DSP), an application specific integrated circuit (ASIC), a field programmable gate array (FPGA) or other programmable logic devices, discrete gate or transistor logic devices, discrete hardware components, which can implement or execute the methods, steps, and logic block diagrams disclosed in the embodiments of the present application. A general purpose processor can be a microprocessor or the processor can be any conventional processor and the like. The steps of the method disclosed in conjunction with the embodiments of the present application can be directly embodied as executed by a hardware decoding processor, or executed by a combination of hardware and software modules in the decoding processor. The software modules can be located in random access memory, flash memory, read-only memory, programmable read-only memory or electrically erasable programmable memory, registers and other storage media mature in the art. The storage medium is located in the memory 502, and the processor 501 reads the information in the memory 502, and completes the steps of the above methods in combination with its hardware.

In an embodiment, the embodiments described herein can be implemented in hardware, software, firmware, middleware, microcode, or a combination thereof. For hardware implementation, the processing unit can be implemented in one or more application specific integrated circuits (ASIC), digital signal processing (DSP), DSP device (DSPD), programmable logic device (PLD), field-programmable gate array (FPGA), general purpose processor, controller, microcontroller, microprocessor, other electronic unit for performing the functions described in the present application or a combination thereof.

For software implementation, the described solutions of the present application can be implemented through modules (such as procedures, functions and the like) that perform the functions described in the embodiments of the present application. Software codes can be stored in memory and executed by a processor. The memory can be implemented in the processor or external to the processor.

In another embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value.

In another embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The programs can cause the processor 501 to perform the steps of:

sending first offset signaling for indicating the setting offset value to the second device.

In another embodiment, the programs can cause the processor 501 to perform the steps of:

configuring the first information for each of one or more first signal resources; or configuring the first information for each of one or more first signal resource sets; or configuring a common first information for all the first signal resources and/or all the first signal resource sets triggered or activated by a same signaling.

In another embodiment, the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

In another embodiment, the first offset value is used for indicating m time units, where m is a first number;

a time unit where the time-domain transmission location is located is the m-th available time unit after a first time unit; or a time unit where the time-domain transmission location is located is the $1^{st}$ available time unit after m available time units after a first time unit; or a time unit where the time-domain transmission location is located is the m-th time unit after a first time unit; or a time unit where the time-domain transmission location is located is the $1^{st}$ time unit after m time units after a first time unit; or a time unit where the time-domain transmission location is located is the m-th available time unit counting from a first time unit; or a time unit where the time-domain transmission location is located is the $1^{st}$ available time unit after the m-th available time unit counting from a first time unit; or a time unit where the time-domain transmission location is located is the m-th time unit counting from a first time unit; or a time unit where the time-domain transmission location is located is the $1^{st}$ time unit counting from the (m+1)-th time unit counting from a first time unit; or a starting time unit of the time-domain transmission location is the m-th available time unit after a first time unit; or a starting time unit of the time-domain transmission location is the $1^{st}$ available time unit after m available time units after a first time unit; or a starting time unit of the time-domain transmission location is the m-th time unit after a first time unit; or a starting time unit of the time-domain transmission location is the $1^{st}$ time unit after m time units after a first time unit; or a starting time unit of the time-domain transmission location is the m-th available time unit counting from a first time unit; or a starting time unit of the time-domain transmission location is the $1^{st}$ available time unit after the m-th available time unit counting from a first time unit; or a starting time unit of the time-domain transmission location is the m-th time unit counting from a first time unit; or a starting time unit of the time-domain transmission location is the $1^{st}$ time unit counting from the (m+1)-th time unit counting from a first time unit.

In an embodiment, the first time unit is one of the followings:

a time unit where first signaling is located, where the first signaling is used for triggering a transmission of the signal corresponding to the first signal resource and/or the first signal resource set; or a time unit where a signaling for transmitting the first information is located.

In another embodiment, the setting offset value is used for indicating k time units; and the second offset value is used for indicating t time units, where k is a second number and t is a third number;

a time unit where the time-domain transmission location is located is the t-th available time unit counting from the (k+1)-th time unit after a second time unit; or a time unit where the time-domain transmission location is located is the $1^{st}$ available time unit after t available time units counting from the (k+1)-th time unit counting from a second time unit; or a time unit where the time-domain transmission location is located is the (k+t)-th time unit after a second time unit; or a time unit where the time-domain transmission location is located is the $1^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the $1^{st}$ available time unit after t available time units after the k-th time unit counting from a second time unit; or a time unit where the time-domain transmission location is located is the (t+k)-th time unit counting from a second time unit; or a time unit where the time-domain transmission location is located is the $1^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the $1^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the $1^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the $1^{st}$ available time unit after t available time units after the k-th time unit counting from a second time unit; or a starting time unit of the time-domain transmission location is the (t+k)-th time unit counting from a second time unit; or a starting time unit of the time-domain transmission location is the $1^{st}$ time unit counting from the (k+t+1) time units counting from a second time unit.

In an embodiment, the second time unit is one of the followings:

a time unit where second signaling is located, where the second signaling is used for triggering a transmission of the signal corresponding to the first signal resource and/or the first signal resource set; or a time unit where a signaling for transmitting the first information is located.

In another embodiment, the second offset value is valid within a first time window;

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In another embodiment, the programs can cause the processor 501 to perform the steps of:

configuring second information for the second device, where the second information is used for indicating candidate time-domain transmission locations of the signal corresponding to the first signal resource and/or the first signal resource set; and sending the second information to the second device.

The first information is used for indicating the time-domain transmission location of the signal corresponding to the first signal resource and/or the first signal resource set, includes:

the first information is used for selecting the time-domain transmission location of the signal corresponding to the first signal resource and/or the first signal resource set from candidate time-domain transmission locations.

In another embodiment, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a downlink control information (DCI) for triggering the transmission of the signal corresponding to the downlink signal resource, and the minimum timing requirement is the one for transmission of the first signal and a DCI triggering the first signal.

In another embodiment, the sending the first information to the second device through the signaling, includes:

sending the first information to the second device through a first DCI and/or a first medium access control layer-control element (MAC-CE); or sending a joint coding result to the second device through a second DCI and/or a second MAC-CE;

where a DCI format of the first DCI is a DCI format for carrying the first information; and/or the first DCI includes an information field for carrying the first information; and the joint coding result is a result obtained by jointly coding a trigger message and the first information and the trigger message is used for triggering the transmission of the signal corresponding to the first signal resource and/or the first signal resource set.

In another embodiment, the programs can cause the processor 501 to further perform the steps of:

configuring third information for the second device, where the third information is used for indicating that whether the first device configures the first information for the second device; and/or configuring fourth information for the second device, where the fourth information is used for indicating a bit width of the first information.

It should be noted here that the processor 501 can perform all steps of the method embodiments and achieve the same beneficial effects, and the same steps of the method and the same beneficial effects in the device embodiments will not be repeated here.

The solutions according to the embodiments of the present application have been described from the perspective of network side devices. It should be noted that, in order to provide the above-mentioned functions, the network side device provided by the embodiments of the present application includes corresponding hardware structures and/or software modules for executing each function. Embodiments of the present application can be implemented in hardware or a combination of hardware and computer software with the units and algorithm steps of each example described in conjunction with the embodiments disclosed in the present application.

Whether certain function is executed by a computer software or driving hardware depends on the specific application and design constraint conditions of the solutions. Professionals and technicians can use different methods for each specific application to implement the described functions, but such implementation should not be considered beyond the scope of the present application.

In the embodiments of the present application, the network side device can be divided into electronic devices and the like according to the foregoing method examples. For example, each functional module can be divided corresponding to each function, or two or more functions can be integrated into a processing device. The above-mentioned integrated unit can be implemented in the form of hardware or software functional unit.

It should be noted that, the division of modules in the embodiments of the present application is schematic, and is only a logical function division, and there can be other division manners in actual implementation.

The convenience and conciseness of the description, the division of the above-mentioned functional modules is only used for illustration. In practical applications, the above-mentioned functions can be allocated to different functional modules as required. The internal structure of the device is divided into different functional modules to complete all or part of the functions described above. For the specific working process of the system, apparatus and unit described above, reference can be made to the corresponding process in the foregoing method embodiments, and details are not described herein again.

In the several embodiments provided in the present application, the disclosed device and method can be implemented in other manners. For example, the device embodiments described above are only illustrative. For example, the division of the modules or units is only a logical function division and there can be other division methods in actual implementation. For example, multiple units or elements can be incorporated or integrated into another system, or some features can be omitted, or not implemented. On the other hand, the shown or discussed mutual coupling or direct coupling or communication connection can be indirect coupling or communication connection of devices or units through some interfaces.

The units described as separate components may or may not be physically separate, and the components displayed as units may or may not be physical units, that is, may be located at the same place, or it may be distributed to multiple network units. Some or all of the units can be selected according to actual needs to achieve the purpose of the solution of the present embodiment.

In addition, the functional units in the various embodiments of the present application can be integrated into one processing unit, or each unit can exist alone physically, or two or more units can be integrated into one unit. The above-mentioned integrated units can be implemented in the form of software functional units.

If the integrated unit is implemented in the form of a software functional unit and sold or used as an independent product, it can be stored in a computer readable storage medium. Based on such understanding, a part of or all the solutions can be embodied in the form of a software product, which is stored in a storage medium, including several instructions to cause a computer device (which can be a personal computer, server, or network device, etc.) to perform all or part of the steps of the methods described in the respective embodiments of the present application. The computer-readable storage medium is non-transitory, and includes USB flash memory, mobile hard disk, Read-Only Memory (ROM), Random Access Memory (RAM), magnetic disk or optical disk and other media that can store program codes.

Figure 6:
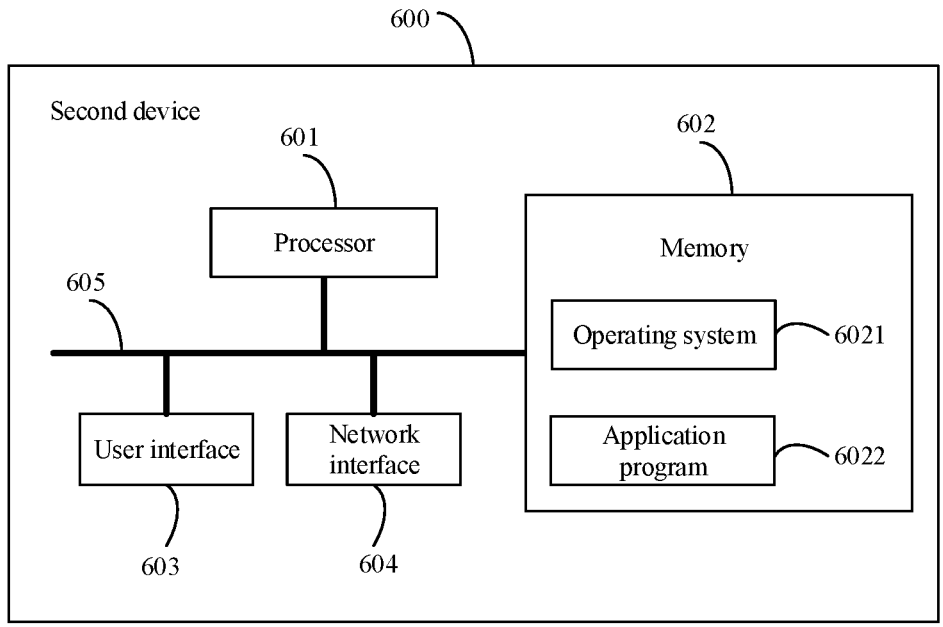
FIG. 6 is a schematic structural diagram of a second device according to an embodiment of the present application.

FIG. 6 is a schematic structural diagram of a second device, such as terminal, according to an embodiment of the present application. As shown in FIG. 6, the second device 600 can include at least one processor 601, a memory 602, at least one network interface 604 and other user interfaces 603. Various components in the second device 600 are coupled together through the bus system 605. In an embodiment, the bus system 605 is used to connect and communicate between these components. In addition to the data bus, the bus system 605 also includes a power bus, a control bus and a status signal bus. However, for the sake of clarity, the various buses are labeled as the bus system 605 in FIG. 6.

Herein, the user interface 603 can include a display, a keyboard, or a clicking device, such as a mouse, a trackball, a touch pad, or a touch screen.

In an embodiment, the memory 602 in the embodiments of the present application can be a volatile memory or a non-volatile memory, or can include both volatile and non-volatile memory. The non-volatile memory can be read-only memory (ROM), programmable read-only memory (PROM), erasable programmable read-only memory (Erasable PROM, EPROM), electrically erase programmable read-only memory (Electrically EPROM, EEPROM) or flash memory. The volatile memory can be random access memory (RAM), which is used as an external cache. By way of example but not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 602 of the systems and methods described in various embodiments of the present application is intended to include, but not be limited to, these and any other suitable types of memory.

In some embodiments, memory 602 stores the following components: executable modules or data structures, or subsets thereof, or extended sets of them, such as operating system 6021 and application program 6022.

Herein, the operating system 6021 includes various system programs, such as a framework layer, a core library layer, a driver layer and the like, to implement various basic services and process hardware-based tasks. The application program 6022 includes various application programs, such as a media player, a browser and the like, to implement various application services. The program for implementing the methods of the embodiments of the present application can be included in the application program 6022.

In an embodiment of the present application, by calling the computer program or instruction, which can be the computer program or instruction stored in the application program 6022, stored in the memory 602, the programs can cause the processor 601 to perform the steps of:

receiving first information sent by a first device through signaling, where the first information is used for indicating a time-domain transmission location of a signal corresponding to a first signal resource and/or a first signal resource set; and determining a time-domain transmission location of a signal corresponding to a first signal resource and/or a first signal resource set based on the first information.

The methods disclosed in the above embodiments of the present application can be applied to the processor 601 or implemented by the processor 601. The processor 601 can be an integrated circuit chip with signal processing capability. In the implementation process, each step of the above methods can be completed by an integrated logic circuit of hardware in the processor 601 or an instruction in the form of software. The above processor 601 can be a general purpose processor, a digital signal processor (DSP), an application specific integrated circuit (ASIC), a field programmable gate array (FPGA) or other programmable logic devices, discrete gate or transistor logic devices, discrete hardware components, which can implement or execute the methods, steps, and logic block diagrams disclosed in the embodiments of the present application. A general purpose processor can be a microprocessor or the processor can be any conventional processor and the like. The steps of the method disclosed in conjunction with the embodiments of the present application can be directly embodied as executed by a hardware decoding processor, or executed by a combination of hardware and software modules in the decoding processor. The software modules can be located in random access memory, flash memory, read-only memory, programmable read-only memory or electrically erasable programmable memory, registers and other storage media mature in the art. The storage medium is located in the memory 602, and the processor 601 reads the information in the memory 602, and completes the steps of the above methods in combination with its hardware.

In an embodiment, the embodiments described herein can be implemented in hardware, software, firmware, middleware, microcode, or a combination thereof. For hardware implementation, the processing unit can be implemented in one or more application specific integrated circuits (ASIC), digital signal processing (DSP), DSP device (DSPD), programmable logic device (PLD), field-programmable gate array (FPGA), general purpose processor, controller, microcontroller, microprocessor, other electronic unit for performing the functions described in the present application or a combination thereof.

For software implementation, the described solutions of the present application can be implemented through modules (such as procedures, functions and the like) that perform the functions described in the embodiments of the present application. Software codes can be stored in memory and executed by a processor. The memory can be implemented in the processor or external to the processor.

In another embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value;

the determining the time-domain transmission location of the signal corresponding to the first signal resource and/or the first signal resource set based on the first information, includes:

determining the time-domain transmission location based on the first offset value, or the first offset value and the first signal transmission mode.

In another embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The programs can cause the processor 601 to further perform the steps of:

receiving first offset signaling sent by the first device and used for indicating the setting offset value;

the determining the time-domain transmission location of the signal corresponding to the first signal resource and/or the first signal resource set based on the first information, includes:

determining the time-domain transmission location based on the second offset value and the setting offset value, or based on the second offset value and the second signal transmission mode.

In another embodiment, the programs can cause the processor 601 to further perform the steps of:

sending the signal corresponding to the first signal resource and/or the first signal resource set at the time-domain transmission location; or receiving the signal corresponding to the first signal resource and/or the first signal resource set at the time-domain transmission location.

In another embodiment, the receiving the first information sent by the first device through the signaling, includes:

receiving the first information configured by the first device for each of one or more first signal resources; or receiving the first information configured by the first device for each of one or more first signal resource sets; or receiving a common first information configured by the first device for all the first signal resources and/or all the first signal resource sets triggered or activated by a same signaling.

In another embodiment, the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

In another embodiment, the first offset value is used for indicating m time units, where m is a first number;

the determining the time-domain transmission location based on the first offset value, or the first offset value and the first signal transmission mode, includes:

determining, based on the first offset value, or the first offset value and the first signal transmission mode, the time-domain transmission location satisfying one of the following cases:

a time unit where the time-domain transmission location is located is the m-th available time unit after a first time unit; or a time unit where the time-domain transmission location is located is the $1^{st}$ available time unit after m available time units after a first time unit; or a time unit where the time-domain transmission location is located is the m-th time unit after a first time unit; or a time unit where the time-domain transmission location is located is the $1^{st}$ time unit after m time units after a first time unit; or a time unit where the time-domain transmission location is located is the m-th available time unit counting from a first time unit; or a time unit where the time-domain transmission location is located is the $1^{st}$ available time unit after the m-th available time unit counting from a first time unit; or a time unit where the time-domain transmission location is located is the m-th time unit counting from a first time unit; or a time unit where the time-domain transmission location is located is the $1^{st}$ time unit counting from the (m+1)-th time unit counting from a first time unit; or a starting time unit of the time-domain transmission location is the m-th available time unit after a first time unit; or a starting time unit of the time-domain transmission location is the $1^{st}$ available time unit after m available time units after a first time unit; or a starting time unit of the time-domain transmission location is the m-th time unit after a first time unit; or a starting time unit of the time-domain transmission location is the $1^{st}$ time unit after m time units after a first time unit; or a starting time unit of the time-domain transmission location is the m-th available time unit counting from a first time unit; or a starting time unit of the time-domain transmission location is the $1^{st}$ available time unit after the m-th available time unit counting from a first time unit; or a starting time unit of the time-domain transmission location is the m-th time unit counting from a first time unit; or a starting time unit of the time-domain transmission location is the $1^{st}$ time unit counting from the (m+1)-th time unit counting from a first time unit.

In an embodiment, the first time unit is one of the followings:

a time unit where first signaling is located, where the first signaling is used for triggering a transmission of the signal corresponding to the first signal resource and/or the first signal resource set; or a time unit where a signaling for transmitting the first information is located.

In still yet another embodiment, the setting offset value is used for indicating k time units; and the second offset value is used for indicating t time units, where k is a second number and t is a third number;

the determining the time-domain transmission location based on the second offset value and the setting offset value, or based on the second offset value and the second signal transmission mode, includes:

determining, based on the second offset value and the setting offset value, or the second offset value and the second signal transmission mode, the time-domain transmission location satisfying one of the following cases:

a time unit where the time-domain transmission location is located is the t-th available time unit counting from the (k+1)-th time unit after a second time unit; or a time unit where the time-domain transmission location is located is the $1^{st}$ available time unit after t available time units counting from the (k+1)-th time unit counting from a second time unit; or a time unit where the time-domain transmission location is located is the (k+t)-th time unit after a second time unit; or a time unit where the time-domain transmission location is located is the $1^{st}$ time unit after the (k+t+1)-th time unit counting from a second time unit; or a time unit where the time-domain transmission location is located is the t-th available time unit counting from the (k+1)-th time unit counting from a second time unit; or a time unit where the time-domain transmission location is located is the $1^{st}$ available time unit after t available time units after the k-th time unit counting from a second time unit; or a time unit where the time-domain transmission location is located is the (t+k)-th time unit counting from a second time unit; or a time unit where the time-domain transmission location is located is the $1^{st}$ time unit counting from (k+t+1) time units counting from a second time unit; or a starting time unit of the time-domain transmission location is the t-th available time unit counting from the (k+1)-th time unit after a second time unit; or a starting time unit of the time-domain transmission location is the $1^{st}$ available time unit after t available time units counting from the (k+1)-th time unit counting from a second time unit; or a starting time unit of the time-domain transmission location is the (k+t)-th time unit after a second time unit; or a starting time unit of the time-domain transmission location is the $1^{st}$ time unit after the (k+t+1)-th time unit counting from a second time unit; or a starting time unit of the time-domain transmission location is the t-th available time unit counting from the (k+1)-th time unit counting from a second time unit; or a starting time unit of the time-domain transmission location is the $1^{st}$ available time unit after t available time units after the k-th time unit counting from a second time unit; or a starting time unit of the time-domain transmission location is the (t+k)-th time unit counting from a second time unit; or a starting time unit of the time-domain transmission location is the $1^{st}$ time unit counting from the (k+t+1) time units counting from a second time unit.

In an embodiment, the second time unit is one of the followings:

a time unit where second signaling is located, where the second signaling is used for triggering a transmission of the signal corresponding to the first signal resource and/or the first signal resource set; or a time unit where a signaling for transmitting the first information is located.

In another embodiment, the second offset value is valid within a first time window;

the first time window includes:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

In another embodiment, the programs can cause the processor 601 to further perform the steps of:

receiving second information sent by the first device, where the second information is used for indicating candidate time-domain transmission locations of the signal corresponding to the first signal resource and/or the first signal resource set; and determining candidate time-domain transmission locations of the signal corresponding to the first signal resource and/or the first signal resource set based on the second information.

The determining the time-domain transmission location of the signal corresponding to the first signal resource and/or the first signal resource set based on the first information, includes:

selecting, based on the first information, the time-domain transmission location of the signal corresponding to the first signal resource and/or the first signal resource set from candidate time-domain transmission locations.

In another embodiment, in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, and the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, and the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, and the time interval is the one between this slot and a downlink control information (DCI) for triggering the transmission of the signal corresponding to the downlink signal resource, and the minimum timing requirement is the one for transmission of the first signal and a DCI triggering the first signal.

In another embodiment, the receiving the first information sent by the first device through the signaling, includes:

receiving the first information sent by the first device through a first DCI and/or a first medium access control layer-control element (MAC-CE); or receiving a joint coding result sent by the first device through a second DCI and/or a second MAC-CE, and determining the first information based on the joint coding result;

where a DCI format of the first DCI is a DCI format for carrying the first information; and/or the first DCI includes an information field for carrying the first information; and the joint coding result is a result obtained by jointly coding a trigger message and the first information and the trigger message is used for triggering the transmission of the signal corresponding to the first signal resource and/or the first signal resource set.

In another embodiment, the programs can cause the processor 601 to further perform the steps of:

obtaining third information configured by the first device for the second device, where the third information is used for indicating whether the first device configures the first information for the second device; determining that whether the first device configures the first information for the second device according to the third information; and obtaining the first information when it is determined that the first device has configured the first information for the second device; and/or obtaining fourth information configured by the first device for the second device, where the fourth information is used for indicating a bit width of the first information; determining the bit width of the first information according to the fourth information; and determining the first information based on the bit width.

It should be noted here that the processor 601 can perform all steps of the method embodiments and achieve the same beneficial effects, and the same steps of the method and the same beneficial effects in the device embodiments will not be repeated here.

Figure 7:
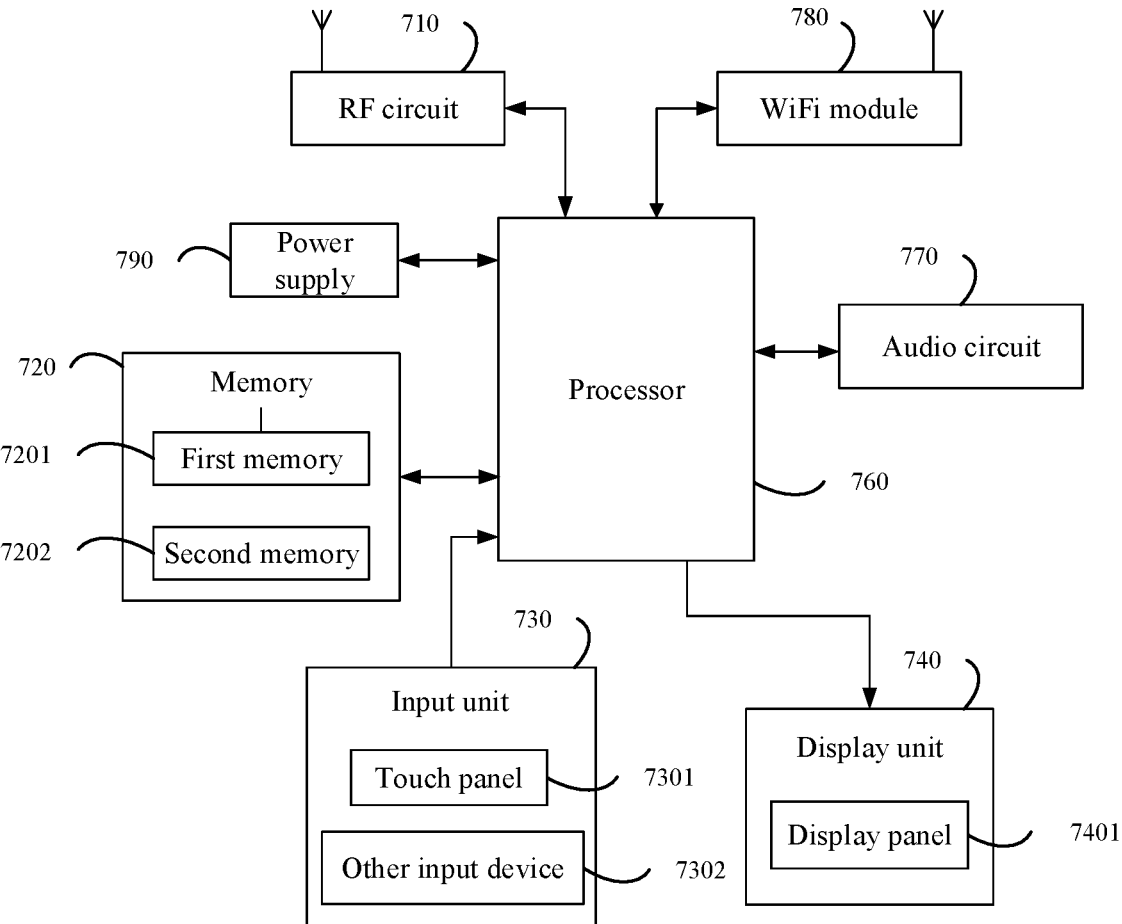
FIG. 7 is another schematic structural diagram of the second device according to an embodiment of the present application.

FIG. 7 is a schematic structural diagram of another second device, such as a terminal, according to an embodiment of the present application. The terminal in FIG. 7 can be a mobile phone, a tablet computer, a personal digital assistant (PDA), or an electronic reader, a handheld game console, point of sales (POS), vehicle electronic devices (vehicle computers) and the like. As shown in FIG. 7, the terminal includes a radio frequency (RF) circuit 710, a memory 720, an input unit 730, a display unit 740, a processor 760, an audio circuit 770, a wireless fidelity (WiFi) module 780 and a power supply 790. It should be noted that the structure of the terminal shown in FIG. 7 does not constitute a limitation on the terminal, and can include more or less components than those shown in the figure, or combine some components, or separate some components, or have different component arrangements.

Herein, the input unit 730 can be used for receiving the numerical or character information input by the user, and generating the signal input related to the user setting and function control of the terminal. In this embodiment of the present application, the input unit 730 can include a touch panel 7301. The touch panel 7301 is also known as the touch screen, which can collect the user's touch operations on or near it (such as the user's operations on the touch panel 7301 using any suitable objects or accessories such as fingers, stylus and the like) and drives the corresponding connection devices according to preset programs. In an embodiment, the touch panel 7301 can include a touch detection device and a touch controller. The touch detection device is configured to detect the user's touch orientation, detect the signal brought by the touch operation, and transmit the signal to the touch controller; the touch controller is configured to receive the touch information from the touch detection device, convert it into contact coordinates, and then send it to the processor 760, and can receive the commands sent by the processor 760 and execute them. In addition, the touch panel 7301 can be implemented in various types such as resistive, capacitive, infrared, and surface acoustic waves. In addition to the touch panel 7301, the input unit 730 can also include other input devices 7302, which can be used to receive input numeric or character information, and generate key signal input related to user settings and function control of the terminal. In an embodiment, other input devices 7302 can include, but not limited to, one or more of physical keyboards, function keys (such as volume control keys, switch keys and the like), trackballs, mice, joysticks, optical mice (optical mice are touch-sensitive mice that do not display visual output surface, or an extension of a touch-sensitive surface formed by a touch screen) and the like.

Herein, the display unit 740 can be used to display information input by the user or information provided to the user and various menu interfaces of the terminal. The display unit 740 can include a display panel 7401. The display panel 7401 can be configured in the form of a liquid crystal display (LCD), an organic light-emitting diode (OLED) and the like.

It should be noted that the touch panel 7301 can cover the display panel 7401 to form a touch display screen. When the touch display screen detects a touch operation on or near it, the touch operation is transmitted to the processor 760 to determine the type of touch event, and then the processor 760 provides corresponding visual output on the touch display screen according to the type of touch event.

The touch screen includes the application program interface display area and the common control display area. The arrangement of the application program interface display area and the common control display area is not limited, and can be an arrangement that can distinguish the two display areas, such as up-down arrangement, left-right arrangement and the like. The application program interface display area can be used to display the interface of the application program. Each interface can contain at least one application icon and/or interface components such as widget desktop controls. The application program interface display area can also be an empty interface that does not contain any content. The common control display area is used to display controls with high usage rate, such as setting buttons, interface numbers, scroll bars, phonebook icons and other application icons.

The RF circuit 710 can be used for receiving and sending signals during sending and receiving information or during a call. In particular, after being received from the network side, the downlink information is processed by the processor 760. In addition, the related uplink data is sent to the network side. Typically, the RF circuit 710 includes, but not limited to, an antenna, at least one amplifier, a transceiver, a coupler, a low noise amplifier (LNA), a duplexer and the like. In addition, RF circuitry 710 can also communicate with networks and other devices via wireless communications. The wireless communication can use any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS) and the like.

The memory 720 is used to store software programs and modules, and the processor 760 executes various functional applications and data processing of the terminal by running the software programs and modules stored in the memory 720. The memory 720 can mainly include a stored program area and a stored data area, where the stored program area can store an operating system, an application program required for at least one function (such as a sound playback function, an image playback function, etc.) and the like; the stored data area can store the data created according to the usage of the terminal (such as audio data, phone book and the like) and the like. Additionally, the memory 720 can include high-speed random access memory, and can also include non-volatile memory, such as at least one magnetic disk storage device, a flash memory device, or other volatile solid state storage device.

Herein the processor 760 is the control center of the terminal, using various interfaces and lines to connect various parts of the entire terminal, running or executing the software programs and/or modules stored in a first memory 7201, and calling the data stored in a second memory 7202, and to perform various functions of the terminal and process data, to monitor the terminal as a whole. In one embodiment, the processor 760 can include one or more processing units.

In the present embodiment of the present application, by calling the software programs and/or modules in the first memory 7201 and/or data stored in the second memory 7202, the programs can cause the processor 760 to perform the steps of:

receiving first information sent by a first device through signaling, where the first information is used for indicating a time-domain transmission location of a signal corresponding to a first signal resource and/or a first signal resource set; and determining the time-domain transmission location of the signal corresponding to the first signal resource and/or the first signal resource set based on the first information.

In another embodiment, the first information includes a first offset value, where the first offset value is used for indicating the time-domain transmission location; or the first information includes the first offset value and a first signal transmission mode, where the first signal transmission mode is used for indicating the second device to determine the time-domain transmission location according to the first offset value;

the determining the time-domain transmission location of the signal corresponding to the first signal resource and/or the first signal resource set based on the first information, includes:

determining the time-domain transmission location based on the first offset value, or the first offset value and the first signal transmission mode.

In another embodiment, the first information includes a second offset value, and the second offset value and a setting offset value are used for indicating the time-domain transmission location; or the first information includes the second offset value and a second signal transmission mode, where the second signal transmission mode is used for indicating the second device to determine the time-domain transmission location according to both the setting offset value and the second offset value.

The programs can cause the processor 760 to further perform the steps of:

receiving first offset signaling sent by the first device and used for indicating the setting offset value;

the determining the time-domain transmission location of the signal corresponding to the first signal resource and/or the first signal resource set based on the first information, includes:

determining the time-domain transmission location based on the second offset value and the setting offset value, or based on the second offset value and the second signal transmission mode.

It should be noted here that the processor 760 can perform all steps of the method embodiments and achieve the same beneficial effects, and the same steps of the method and the same beneficial effects in the device embodiments will not be repeated here.

The present application provides a non-transitory computer-readable storage medium having stored thereon computer programs, when executed by the processor, the computer programs are configured to implement the steps of the method mentioned above according to the embodiments, including:

configuring first information for a second device, where the first information is used for indicating a time-domain transmission location of a signal corresponding to a first signal resource and/or a first signal resource set; and sending the first information to the second device through signaling.

The present application provides a non-transitory computer-readable storage medium having stored thereon computer programs, when executed by the processor, the computer programs are configured to implement the steps of the method mentioned above according to the embodiments, including:

receiving first information sent by a first device through signaling, where the first information is used for indicating a time-domain transmission location of a signal corresponding to a first signal resource and/or a first signal resource set; and determining the time-domain transmission location of the signal corresponding to the first signal resource and/or the first signal resource set based on the first information.

Finally, it should be noted that the above embodiments are only used to explain the solutions of the present application, and are not limited thereto; although the present application has been described in detail with reference to the foregoing embodiments, modifications of the solutions documented in the foregoing embodiments and make equivalent substitutions to a part of the embodiments; these modifications and substitutions do not make the essence of the corresponding solutions depart from the scope of the solutions of various embodiments of the present application.

What is claimed is:

1. A method for transmitting a signal, performed by a first device, comprising:

sending first information to the second device through signaling, wherein the first information is used for indicating a time-domain transmission location of a signal corresponding to a first signal resource and/or a first signal resource set;

wherein the first information comprises a second offset value, and the second offset value and a setting offset value are used for indicating the time-domain transmission location; or the first information comprises the second offset value and a second signal transmission mode, wherein the second signal transmission mode is used for indicating the second device to determine the time-domain transmission location according to both the setting offset value and the second offset value;

the method further comprises sending first offset signaling for indicating the setting offset value to the second device;

wherein the setting offset value is used for indicating k time units; and the second offset value is used for indicating t time units, where k is a second number and t is a third number;

a time unit where the time-domain transmission location is located is the t-th available time unit after the k-th time unit after a second time unit; or a time unit where the time-domain transmission location is located is the $1^{st}$ available time unit after t available time units after the k-th time unit after a second time unit; or a time unit where the time-domain transmission location is located is the t-th available time unit counting from the k-th time unit after a second time unit; or a time unit where the time-domain transmission location is located is the (t+1)-th available time unit counting from the k-th time unit after a second time unit; or a starting time unit of the time-domain transmission location is the t-th available time unit after the k-th time unit after a second time unit; or a starting time unit of the time-domain transmission location is the $1^{st}$ available time unit after t available time units after the k-th time unit after a second time unit; or a starting time unit of the time-domain transmission location is the t-th available time unit counting from the k-th time unit after a second time unit; or a starting time unit of the time-domain transmission location is the (t+1)-th available time unit counting from the k-th time unit after a second time unit;

wherein the second time unit is one of the followings:

a time unit where second signaling is located, wherein the second signaling is used for triggering a transmission of the signal corresponding to the first signal resource and/or the first signal resource set; or a time unit where a signaling for transmitting the first information is located.

2. The method of claim 1, wherein the first information is configured by:

configuring the first information for each of one or more first signal resources; or configuring the first information for each of one or more first signal resource sets; or configuring a common first information for all the first signal resources and/or all the first signal resource sets triggered or activated by a same signaling.

3. The method of claim 1, wherein:

the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

4. The method of claim 1, further comprising:

configuring second information for the second device, wherein the second information is used for indicating a plurality of candidate time-domain transmission locations of the signal corresponding to the first signal resource and/or the first signal resource set; and sending the second information to the second device;

wherein the first information is used for indicating the time-domain transmission location of the signal corresponding to the first signal resource and/or the first signal resource set, comprises:

wherein the first information is used for selecting the time-domain transmission location of the signal corresponding to the first signal resource and/or the first signal resource set from the plurality of candidate time-domain transmission locations.

5. The method of claim 1, wherein the sending the first information to the second device through the signaling, comprises:

sending the first information to the second device through a first DCI and/or a first medium access control layer-control element (MAC-CE); or sending a joint coding result to the second device through a second DCI and/or a second MAC-CE;

wherein a DCI format of the first DCI is a DCI format for carrying the first information; and/or the first DCI comprises an information field for carrying the first information; and the joint coding result is a result obtained by jointly coding a trigger message and the first information and the trigger message is used for triggering the transmission of the signal corresponding to the first signal resource and/or the first signal resource set.

6. The method of claim 1, further comprising:

configuring third information for the second device, wherein the third information is used for indicating that whether the first device configures the first information for the second device; and/or configuring fourth information for the second device, wherein the fourth information is used for indicating a bit width of the first information.

7. A method for transmitting a signal, performed by a second device, comprising:

receiving first information sent by a first device through signaling, wherein the first information is used for indicating a time-domain transmission location of a signal corresponding to a first signal resource and/or a first signal resource set; and determining the time-domain transmission location of the signal corresponding to the first signal resource and/or the first signal resource set based on the first information;

wherein the first information comprises a second offset value and the second offset value and a setting offset value are used for indicating the time-domain transmission location; or the first information comprises the second offset value and a second signal transmission mode, wherein the second signal transmission mode is used for indicating the second device to determine the time-domain transmission location according to both the setting offset value and the second offset value;

the method further comprises:

receiving first offset signaling sent by the first device and used for indicating the setting offset value;

the determining the time-domain transmission location of the signal corresponding to the first signal resource and/or the first signal resource set based on the first information comprises:

determining the time-domain transmission location based on the second offset value and the setting offset value, or based on the second offset value and the second signal transmission mode;

wherein the setting offset value is used for indicating k time units; and the second offset value is used for indicating t time units, where k is a second number and t is a third number;

a time unit where the time-domain transmission location is located is the t-th available time unit after the k-th time unit after a second time unit; or a time unit where the time-domain transmission location is located is the $1^{st}$ available time unit after t available time units after the k-th time unit after a second time unit; or a time unit where the time-domain transmission location is located is the t-th available time unit counting from the k-th time unit after a second time unit; or a time unit where the time-domain transmission location is located is the (t+1)-th available time unit counting from the k-th time unit after a second time unit; or a starting time unit of the time-domain transmission location is the t-th available time unit after the k-th time unit after a second time unit; or a starting time unit of the time-domain transmission location is the $1^{st}$ available time unit after t available time units after the k-th time unit after a second time unit; or a starting time unit of the time-domain transmission location is the t-th available time unit counting from the k-th time unit after a second time unit; or a starting time unit of the time-domain transmission location is the (t+1)-th available time unit counting from the k-th time unit after a second time unit;

wherein the second time unit is one of the followings:

a time unit where second signaling is located, wherein the second signaling is used for triggering a transmission of the signal corresponding to the first signal resource and/or the first signal resource set; or a time unit where a signaling for transmitting the first information is located.

8. The method of claim 7, further comprising:

sending the signal corresponding to the first signal resource and/or the first signal resource set at the time-domain transmission location; or receiving the signal corresponding to the first signal resource and/or the first signal resource set at the time-domain transmission location.

9. The method of claim 7, wherein the receiving the first information sent by the first device through the signaling, comprises:

receiving the first information configured by the first device for each of one or more first signal resources; or receiving the first information configured by the first device for each of one or more first signal resource sets; or receiving a common first information configured by the first device for all the first signal resources and/or all the first signal resource sets triggered or activated by a same signaling.

10. The method of claim 7, wherein:

the first signal resource is an aperiodic uplink signal resource; and/or the first signal resource is a semi-persistent uplink signal resource; and/or the first signal resource set is an aperiodic uplink signal resource set; and/or the first signal resource set is a semi-persistent uplink signal resource set; and/or the first signal resource is an aperiodic downlink signal resource; and/or the first signal resource is a semi-persistent downlink signal resource; and/or the first signal resource set is an aperiodic downlink signal resource set; and/or the first signal resource set is a semi-persistent downlink signal resource set.

11. The method of claim 7, wherein the second offset value is valid in a first time window;

the first time window comprises:

a time window from the second offset value being valid to the second device receiving a new second offset value; or a time window from the second offset value being valid to the second device receiving a signaling for invalidating the second offset value; or a time window from the second offset value being valid to the second device receiving a signaling for re-configuring the first signal resource and/or the first signal resource set; or a predefined time window.

12. The method of claim 7, further comprising:

receiving second information sent by the first device, wherein the second information is used for indicating a plurality of candidate time-domain transmission locations of the signal corresponding to the first signal resource and/or the first signal resource set; and determining the plurality of candidate time-domain transmission locations of the signal corresponding to the first signal resource and/or the first signal resource set based on the second information;

the determining the time-domain transmission location of the signal corresponding to the first signal resource and/or the first signal resource set based on the first information, comprises:

selecting, based on the first information, the time-domain transmission location of the signal corresponding to the first signal resource and/or the first signal resource set from the plurality of candidate time-domain transmission locations.

13. The method of claim 7, wherein in case that the first signal resource is an aperiodic uplink signal resource or a semi-persistent uplink signal resource, an available time unit is a slot satisfying: there are uplink symbols for the time-domain transmission location for the uplink signal resource; or in case that the first signal resource set is an aperiodic uplink signal resource set or a semi-persistent uplink signal resource set, an available time unit is a slot satisfying: there are uplink symbols for the time-domain transmission location for all uplink signal resources in the uplink signal resource set; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot that can be used for uplink transmission; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot; or in case that the first signal resource is an aperiodic uplink signal resource or a semi-persistent uplink signal resource, an available time unit is a slot satisfying: a time interval is not less than a minimum timing requirement and there are uplink symbols for the time-domain transmission location for the uplink signal resource, wherein the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource set is an aperiodic uplink signal resource set or a semi-persistent uplink signal resource set, an available time unit is a slot satisfying: a time interval is not less than a minimum timing requirement and there are uplink symbols for the time-domain transmission location for all uplink signal resources in the uplink signal resource set, wherein the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is a slot satisfying: a time interval is not less than a minimum timing requirement and that can be used for uplink transmission, wherein the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic uplink signal resource or a semi-persistent uplink signal resource, or the first signal resource set is an aperiodic uplink signal resource set or a semi-persistent uplink signal resource set, an available time unit is an uplink slot satisfying: a time interval is not less than a minimum timing requirement, wherein the time interval is the one between this slot and a downlink control information (DCI) for triggering the transmission of the signal corresponding to the uplink signal resource, and the minimum timing requirement is the one for transmission of the first signal and a DCI triggering the first signal; or in case that the first signal resource is an aperiodic downlink signal resource or a semi-persistent downlink signal resource, an available time unit is a slot satisfying: there are downlink symbols for the time-domain transmission location for the downlink signal resource; or in case that the first signal resource set is an aperiodic downlink signal resource set or a semi-persistent downlink signal resource set, an available time unit is a slot satisfying: there are downlink symbols for the time-domain transmission location for all downlink signal resources in the downlink signal resource set; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot that can be used for downlink transmission; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot; or in case that the first signal resource is an aperiodic downlink signal resource or a semi-persistent downlink signal resource, an available time unit is a slot satisfying: a time interval is not less than a minimum timing requirement and there are downlink symbols for the time-domain transmission location for the downlink signal resource, wherein the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource set is an aperiodic downlink signal resource set or a semi-persistent downlink signal resource set, an available time unit is a slot satisfying: a time interval is not less than a minimum timing requirement and there are downlink symbols for the time-domain transmission location for all downlink signal resources in the downlink signal resource set, wherein the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a slot satisfying: a time interval is not less than a minimum timing requirement and that can be used for downlink transmission, wherein the time interval is the one between this slot and a downlink control information (DCI) for triggering the transmission of the signal corresponding to the downlink signal resource, and the minimum timing requirement is the one for transmission of the first signal and a DCI triggering the first signal; or in case that the first signal resource is an aperiodic downlink signal resource or a semi-persistent downlink signal resource, or the first signal resource set is an aperiodic downlink signal resource set or a semi-persistent downlink signal resource set, an available time unit is a downlink slot satisfying: a time interval is not less than a minimum timing requirement, wherein the time interval is the one between this slot and a downlink control information (DCI) for triggering the transmission of the signal corresponding to the downlink signal resource, and the minimum timing requirement is the one for transmission of the first signal and a DCI triggering the first signal.

14. The method of claim 7, wherein the receiving the first information sent by the first device through the signaling, comprises:

receiving the first information sent by the first device through a first DCI and/or a first medium access control layer-control element (MAC-CE); or receiving a joint coding result sent by the first device through a second DCI and/or a second MAC-CE, and determining the first information based on the joint coding result;

wherein a DCI format of the first DCI is a DCI format for carrying the first information; and/or the first DCI comprises an information field for carrying the first information; and the joint coding result is a result obtained by jointly coding a trigger message and the first information and the trigger message is used for triggering the transmission of the signal corresponding to the first signal resource and/or the first signal resource set.

15. The method of claim 7, further comprising:

obtaining third information configured by the first device for the second device, wherein the third information is used for indicating whether the first device configures the first information for the second device; determining that whether the first device configures the first information for the second device according to the third information; and obtaining the first information when it is determined that the first device has configured the first information for the second device; and/or obtaining fourth information configured by the first device for the second device, wherein the fourth information is used for indicating a bit width of the first information; determining the bit width of the first information according to the fourth information; and determining the first information based on the bit width.

16. A first device, comprising: a processor; and a memory storing programs that are executable by the processor, wherein the programs, when performed by the processor, cause the processor to perform the following steps:

sending first information to the second device through signaling, wherein the first information is used for indicating a time-domain transmission location of a signal corresponding to a first signal resource and/or a first signal resource set;

wherein the first information comprises a second offset value and the second offset value and a setting offset value are used for indicating the time-domain transmission location; or the first information comprises the second offset value and a second signal transmission mode, wherein the second signal transmission mode is used for indicating the second device to determine the time-domain transmission location according to both the setting offset value and the second offset value;

the programs cause the processor to further perform the steps of:

sending first offset signaling for indicating the setting offset value to the second device;

wherein the setting offset value is used for indicating k time units; and the second offset value is used for indicating t time units, where k is a second number and t is a third number;

a time unit where the time-domain transmission location is located is the t-th available time unit after the k-th time unit after a second time unit; or a time unit where the time-domain transmission location is located is the $1^{st}$ available time unit after t available time units after the k-th time unit after a second time unit; or a time unit where the time-domain transmission location is located is the t-th available time unit counting from the k-th time unit after a second time unit; or a time unit where the time-domain transmission location is located is the (t+1)-th available time unit counting from the k-th time unit after a second time unit; or a starting time unit of the time-domain transmission location is the t-th available time unit after the k-th time unit after a second time unit; or a starting time unit of the time-domain transmission location is the $1^{st}$ available time unit after t available time units after the k-th time unit after a second time unit; or a starting time unit of the time-domain transmission location is the t-th available time unit counting from the k-th time unit after a second time unit; or a starting time unit of the time-domain transmission location is the (t+1)-th available time unit counting from the k-th time unit after a second time unit;

wherein the second time unit is one of the followings:

a time unit where second signaling is located, wherein the second signaling is used for triggering a transmission of the signal corresponding to the first signal resource and/or the first signal resource set; or a time unit where a signaling for transmitting the first information is located.

17. A second device, comprising: a processor; and a memory storing programs that are executable by the processor, wherein the programs, when performed by the processor, cause the processor to perform the following steps of claim 7.

* * * * *